US009876920B2

(12) United States Patent
Matsuhara et al.

(10) Patent No.: US 9,876,920 B2
(45) Date of Patent: Jan. 23, 2018

(54) INFORMATION PROCESSING APPARATUS, IMAGE FORMING APPARATUS, NON-TRANSITORY COMPUTER-READABLE RECORDING MEDIUM ENCODED WITH REMOTE OPERATION PROGRAM, AND NON-TRANSITORY COMPUTER-READABLE RECORDING MEDIUM ENCODED WITH REMOTE CONTROL PROGRAM

(71) Applicant: Konica Minolta, Inc., Chiyoda-ku (JP)

(72) Inventors: Kenji Matsuhara, Kawanishi (JP); Junichi Hase, Osaka (JP); Kazusei Takahashi, Nishinomiya (JP); Kazuya Anezaki, Kobe (JP); Hirokazu Kubota, Otsu (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/289,391

(22) Filed: May 28, 2014

(65) Prior Publication Data
US 2014/0355058 A1   Dec. 4, 2014

(30) Foreign Application Priority Data

May 29, 2013 (JP) .................................. 2013-112643

(51) Int. Cl.
*H04N 1/00* (2006.01)
(52) U.S. Cl.
CPC ..... *H04N 1/00381* (2013.01); *H04N 1/00896* (2013.01); *H04N 1/00973* (2013.01); *H04N 1/00307* (2013.01); *H04N 2201/0094* (2013.01)
(58) Field of Classification Search
None
See application file for complete search history.

(56) References Cited

U.S. PATENT DOCUMENTS 5,408,668 A * 4/1995 Tornai ................... G06F 1/3215
                                                713/324
5,982,860 A * 11/1999 Kim ....................... H04M 1/654
                                                379/100.01

(Continued)

FOREIGN PATENT DOCUMENTS

CN          1678010 A      10/2005
CN        101540815 A       9/2009
(Continued)

OTHER PUBLICATIONS

Office Action dated Oct. 25, 2016 issued by the Chinese Patent Office in corresponding Chinese Patent Application No. 201410233998.X, and English language translation of Office Action (34 pages).

(Continued)

*Primary Examiner* — Ted Barnes
(74) *Attorney, Agent, or Firm* — Buchanan Ingersoll & Rooney PC

(57) ABSTRACT

An information processing apparatus remotely controls an image forming apparatus having an operating state changeable. The information processing apparatus includes a remote operation accepting portion to accept a user operation, and a remote control portion to remotely control the image forming apparatus on the basis of a remote operation accepted by the remote operation accepting portion. The remote control portion includes a motion detecting portion to detect a motion of the user, and a state maintaining portion to control the image forming apparatus not to change the operating state while a remote-operation motion for inputting a remote operation is detected by the motion detecting portion after a communication with the image forming apparatus has been established.

26 Claims, 16 Drawing Sheets

(56) References Cited

U.S. PATENT DOCUMENTS

| | | | | |
|---|---|---|---|---|
| 6,622,178 B1* | 9/2003 | Burke | G06F 1/3209 | 710/109 |
| 6,665,719 B1* | 12/2003 | Isoda | H04N 1/32641 | 709/219 |
| 8,634,096 B2* | 1/2014 | Kawabata | H04N 1/00244 | 358/1.1 |
| 8,885,198 B2* | 11/2014 | Naya | G06K 15/4055 | 358/1.14 |
| 8,996,332 B2* | 3/2015 | Kahn | A61B 5/1123 | 702/141 |
| 9,065,955 B2* | 6/2015 | Baba | H04N 1/00323 | |
| 9,111,209 B2* | 8/2015 | Utoh | G06K 15/4055 | |
| 2002/0051541 A1 | 5/2002 | Glick | H04L 63/0421 | 380/258 |
| 2003/0038965 A1* | 2/2003 | Simpson | G06K 15/00 | 358/1.15 |
| 2004/0098664 A1* | 5/2004 | Adelman | G06Q 99/00 | 715/201 |
| 2005/0033582 A1* | 2/2005 | Gadd | G06Q 30/02 | 704/277 |
| 2005/0078334 A1* | 4/2005 | Hisatomi | H04N 1/00291 | 358/1.15 |
| 2005/0113124 A1* | 5/2005 | Syrjarinne | H04W 52/285 | 455/522 |
| 2005/0223324 A1* | 10/2005 | Tashiro | G03G 15/5016 | 715/273 |
| 2006/0061809 A1* | 3/2006 | Murataka | G06T 1/00 | 358/1.15 |
| 2006/0062030 A1* | 3/2006 | Keller | G06F 1/3209 | 363/78 |
| 2008/0007767 A1* | 1/2008 | Ishimaru | G06F 21/35 | 358/1.15 |
| 2008/0008492 A1* | 1/2008 | Meetze | G03G 15/5004 | 399/88 |
| 2008/0074698 A1* | 3/2008 | Richter | G06F 3/1204 | 358/1.15 |
| 2009/0189869 A1* | 7/2009 | Nishimura | G06F 3/0482 | 345/173 |
| 2009/0203330 A1* | 8/2009 | Arimoto | H04M 1/73 | 455/90.2 |
| 2009/0237725 A1* | 9/2009 | Hamaguchi | H04N 1/00222 | 358/1.15 |
| 2009/0237728 A1 | 9/2009 | Yamamoto | | |
| 2009/0257083 A1* | 10/2009 | Ishikura | H04N 1/00344 | 358/1.15 |
| 2009/0259868 A1* | 10/2009 | Katoh | G03G 15/5004 | 713/324 |
| 2009/0316200 A1* | 12/2009 | Kubota | H04N 1/00344 | 358/1.15 |
| 2009/0319221 A1* | 12/2009 | Kahn | A61B 5/1123 | 702/141 |
| 2009/0327322 A1* | 12/2009 | Pall | G06F 9/541 | |
| 2010/0131788 A1* | 5/2010 | Lo | G06F 1/3228 | 713/323 |
| 2010/0198967 A1* | 8/2010 | Takahashi | H04N 1/00344 | 709/224 |
| 2010/0296121 A1* | 11/2010 | Shaheen, III | H04N 1/00214 | 358/1.15 |
| 2010/0312600 A1* | 12/2010 | Motoyama | G06F 3/1218 | 705/7.35 |
| 2010/0318824 A1* | 12/2010 | Tinker | G06F 1/3203 | 713/323 |
| 2011/0058202 A1* | 3/2011 | St. Jacques, Jr. | G06F 3/1203 | 358/1.13 |
| 2011/0149342 A1* | 6/2011 | Tsujii | G06F 3/1206 | 358/1.15 |
| 2012/0050777 A1* | 3/2012 | Matsumoto | H04N 1/00896 | 358/1.13 |
| 2012/0069380 A1* | 3/2012 | Sugimoto | G06F 3/1205 | 358/1.14 |
| 2012/0159330 A1* | 6/2012 | Jeong | G06F 3/017 | 715/716 |
| 2012/0200874 A1* | 8/2012 | Kohara | G03G 15/5016 | 358/1.12 |
| 2012/0250059 A1* | 10/2012 | Itogawa | G06F 3/1204 | 358/1.13 |
| 2012/0327447 A1* | 12/2012 | Funakawa | G06F 3/044 | 358/1.13 |
| 2013/0010333 A1* | 1/2013 | Anand | H04L 67/2823 | 358/1.15 |
| 2013/0114100 A1* | 5/2013 | Torii | G06F 11/0733 | 358/1.14 |
| 2013/0122968 A1* | 5/2013 | Miura | G01C 22/006 | 455/566 |
| 2013/0176593 A1* | 7/2013 | Nakamura | H04N 1/00278 | 358/1.15 |
| 2013/0201510 A1* | 8/2013 | Miyata | G03G 15/5004 | 358/1.13 |
| 2013/0215466 A1* | 8/2013 | Ooba | G06F 3/1221 | 358/1.15 |
| 2013/0229689 A1* | 9/2013 | Bito | H04N 1/32026 | 358/1.15 |
| 2013/0258424 A1* | 10/2013 | Ono | H04N 1/00323 | 358/475 |
| 2013/0286426 A1* | 10/2013 | Morovic | G06F 3/1222 | 358/1.14 |
| 2013/0307998 A1* | 11/2013 | Tautenhahn | H04N 1/00289 | 348/207.1 |
| 2014/0031078 A1* | 1/2014 | Nishikawa | H04W 40/24 | 455/552.1 |
| 2014/0043631 A1* | 2/2014 | Honma | G06F 3/1297 | 358/1.13 |
| 2014/0043632 A1* | 2/2014 | Uchida | G06F 3/1297 | 358/1.13 |
| 2014/0043634 A1* | 2/2014 | Haga | H04N 1/00904 | 358/1.13 |
| 2014/0043644 A1* | 2/2014 | Tsujii | G06F 3/1206 | 358/1.14 |
| 2014/0092417 A1* | 4/2014 | Kuroishi | H04N 1/00342 | 358/1.14 |
| 2014/0153020 A1* | 6/2014 | Tachikawa | H04N 1/00336 | 358/1.13 |
| 2014/0268236 A1* | 9/2014 | Ohara | G06F 3/1224 | 358/1.15 |
| 2014/0300513 A1* | 10/2014 | Takahashi | G01S 19/48 | 342/357.51 |
| 2014/0300921 A1* | 10/2014 | Utoh | G06K 15/4055 | 358/1.14 |
| 2015/0312432 A1* | 10/2015 | Miyata | H04N 1/00896 | 358/443 |

FOREIGN PATENT DOCUMENTS

| | | |
|---|---|---|
| CN | 102346533 A | 2/2012 |
| CN | 103067639 A | 4/2013 |
| CN | 103076918 A | 5/2013 |
| JP | 2003-324556 A | 11/2003 |
| JP | 2006-086642 A | 3/2006 |
| JP | 2007-320051 A | 12/2007 |
| JP | 2009-267644 A | 11/2009 |
| JP | 2009267644 A * | 11/2009 |

OTHER PUBLICATIONS

Office Action ("The Second Office Action") dated Jun. 7, 2017 issued by the Chinese Patent Office in corresponding Chinese Patent Application No. 201410233998.X, and English language translation of Office Action (33 pages).

* cited by examiner

F I G. 1
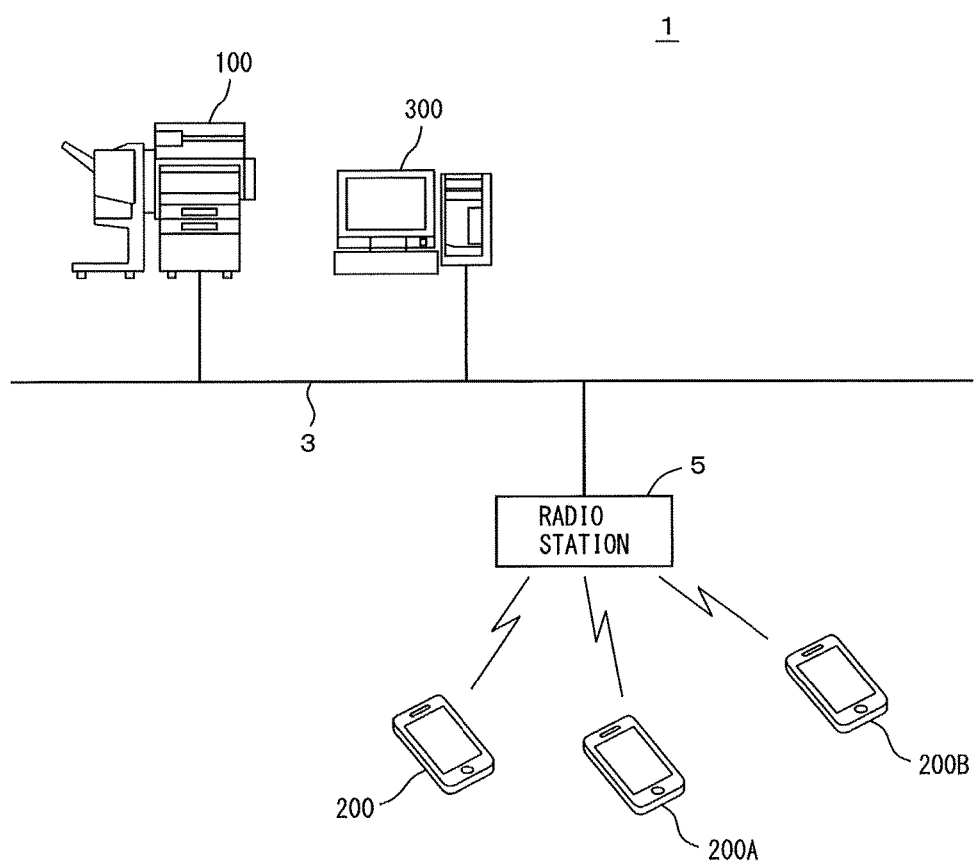

FIG. 8

RELATED PROGRAM TABLE

| No. | APPLICATION IDENTIFICATION INFORMATION |
|---|---|
| 1 | BROWSING PROGRAM |
| 2 | ADDRESS BOOK |
| 3 | IMAGE EDITING PROGRAM |
| 4 | SNS PROGRAM |

INFORMATION PROCESSING APPARATUS, IMAGE FORMING APPARATUS, NON-TRANSITORY COMPUTER-READABLE RECORDING MEDIUM ENCODED WITH REMOTE OPERATION PROGRAM, AND NON-TRANSITORY COMPUTER-READABLE RECORDING MEDIUM ENCODED WITH REMOTE CONTROL PROGRAM

This application is based on Japanese Patent Application No. 2013-112643 filed with Japan Patent Office on May 29, 2013, the entire content of which is hereby incorporated by reference.

BACKGROUND OF THE INVENTION

Field of the Invention

The present invention relates to an information processing apparatus, an image forming apparatus, a non-transitory computer-readable recording medium encoded with a remote operation program, and a non-transitory computer-readable recording medium encoded with a remote control program. More particularly, the present invention relates to an information processing apparatus which remotely controls an image forming apparatus, a non-transitory computer-readable recording medium encoded with a remote operation program which is executed by the information processing apparatus, an image forming apparatus which is remotely controlled by the information processing apparatus, and a non-transitory computer-readable recording medium encoded with a remote control program which is executed by the image forming apparatus.

Description of the Related Art

A technique for remotely operating a multi-function peripheral (MFP) by a mobile information device such as a smartphone is known. For example, Japanese Patent Laid-Open No. 2006-086642 discloses an image forming apparatus which distributes a Web page to a terminal of the image forming apparatus, the image forming apparatus including an operation screen control portion which controls an operation screen which is displayed on a screen of the image forming apparatus and another operation screen which is displayed as the Web page on a screen of the terminal of the image forming apparatus such that the use of one operation screen is limited while the other operation screen is in use.

On the other hand, for the purposes of reducing power consumption, an image forming apparatus has a normal mode, in which an image can be formed immediately, and a power saving mode, in which less power is consumed than in the normal mode although it takes time to form an image. The image forming apparatus has a function of switching the operating mode from the normal mode to the power saving mode when a prescribed time has passed since the last operation was accepted on the operation panel. This means that, while a user is remotely operating the image forming apparatus using a mobile information device, the operating mode of the image forming apparatus may be switched from the normal mode to the power saving mode. In this case, the user needs to wait until the image forming apparatus becomes ready to form an image.

Further, the image forming apparatus has a function of, when a prescribed time has passed since the last operation was accepted on the operation panel, resetting the value that has been set till then, to a default value. This means that, while a user is remotely operating the image forming apparatus using a mobile information device, a set value may be reset to a default value in the image forming apparatus. In this case, the user needs to input the operation for setting a set value from the beginning.

SUMMARY OF THE INVENTION

An aspect of the present invention provides an information processing apparatus which remotely controls an image forming apparatus having an operating state changeable, wherein the information processing apparatus includes: a remote operation accepting portion to accept an operation by a user; and a remote control portion to remotely control the image forming apparatus on the basis of a remote operation accepted by the remote operation accepting portion, the remote control portion including a motion detecting portion to detect a motion of the user, and a state maintaining portion to control the image forming apparatus not to change the operating state while a remote-operation motion for inputting a remote operation is detected by the motion detecting portion after a communication with the image forming apparatus has been established.

Another aspect of the present invention provides an image forming apparatus which is remotely controlled by an information processing apparatus, wherein the image forming apparatus includes: a motion information acquiring portion to acquire, from the information processing apparatus, motion information indicating a motion of a user who is operating the information processing apparatus; a remote-operation motion determining portion to determine whether the motion of the user is a remote-operation motion, on the basis of the motion information acquired by the motion information acquiring portion; and a remotely-controlled-state maintaining portion to maintain a state of being remotely controlled by the information processing apparatus in the case where the remote-operation motion determining portion determines that the motion of the user after a communication with the information processing apparatus has been established is the remote-operation motion.

A further aspect of the present invention provides a non-transitory computer-readable recording medium encoded with a remote operation program which is performed by a computer controlling an information processing apparatus that remotely controls an image forming apparatus having an operating state changeable, wherein the program causes the computer to perform: a remote operation accepting step of accepting an operation of a user; and a remote control step of remotely controlling the image forming apparatus on the basis of a remote operation accepted in the remote operation accepting step, the remote control step including a motion detecting step of detecting a motion of the user, and a state maintaining step of causing the image forming apparatus not to change the operating state while a remote-operation motion for inputting a remote operation is detected in the motion detecting step after a communication with the image forming apparatus has been established.

Yet another aspect of the present invention provides a non-transitory computer-readable recording medium encoded with a remote control program which is performed by a computer controlling an image forming apparatus that is remotely controlled by an information processing apparatus, wherein the program causes the computer to perform: a motion information acquiring step of acquiring, from the information processing apparatus, motion information indicating a motion of a user who is operating the information processing apparatus; a remote-operation motion determining step of determining whether the motion of the user is a remote-operation motion, on the basis of the motion information acquired in the motion information acquiring step;

and a remotely-controlled-state maintaining step of maintaining a state of being remotely controlled by the information processing apparatus in the case where the motion of the user after a communication with the information processing apparatus has been established is determined to be the remote-operation motion in the remote-operation motion determining step.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 1 schematically shows a print system according to an embodiment of the present invention;

FIG. 8 shows an example of a related program table;

DESCRIPTION OF THE PREFERRED EMBODIMENTS

Figure 2:
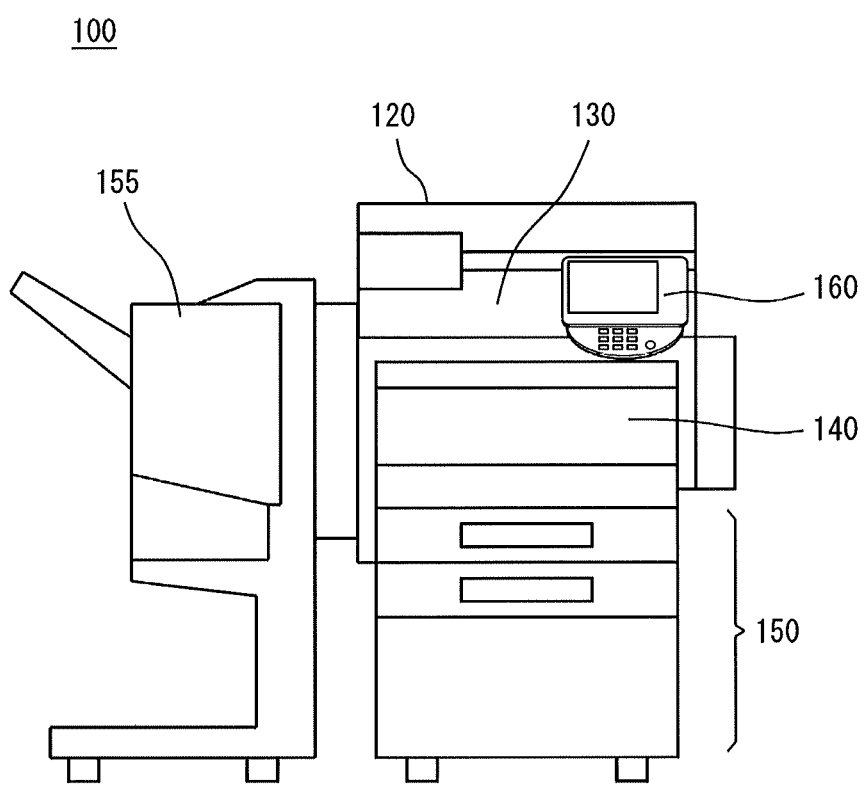
FIG. 2 is a perspective view of an MFP.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

FIG. 1 schematically shows a print system according to an embodiment of the present invention. Referring to FIG. 1, a print system 1 includes a multi-function peripheral (hereinafter, referred to as "MFP") 100 which functions as an image forming apparatus a personal computer (hereinafter, referred to as "PC") 300, a radio station 5, and mobile information devices 200, 200A, and 200B. MFP 100 and PC 300 are each connected to a network 3. Mobile information devices 200, 200A, and 200B are each connected to network 3 through radio station 5.

Network 3 is a local area network (LAN), which may be connected in a wired or wireless manner. Network 3 is not necessarily the LAN; it may be a wide area network (WAN), public switched telephone networks (PSTN), the Internet, or the like.

PC 300 is a typical computer. PC 300 has installed therein a printer driver program corresponding to MFP 100. PC 300 can control MFP 100 by executing the printer driver program, to cause MFP 100 to perform an image forming process, a document reading process, and so on.

Mobile information devices 200, 200A, and 200B are computers, such as smartphones and personal digital assistants (PDAs), which are carried and used by users. As mobile information devices 200, 200A, and 200B have the same hardware configuration and functions, mobile information device 200 will be described representatively, unless specifically stated otherwise. It is here assumed that mobile information device 200 is a smartphone and includes a wireless LAN function and a conversation function. Mobile information device 200 can therefore communicate with a mobile phone base station in a wireless manner so as to be connected to a mobile phone network for conversation.

In print system 1 according to the present embodiment, mobile information device 200 has installed therein a remote operation program for remotely controlling MFP 100. When a user who operates mobile information device 200 inputs a remote operation, mobile information device 200 transmits a remote control command to MFP 100. On the other hand, MFP 100 has installed therein a remote control program for receiving a remote control command from mobile information device 200 and executing a process in accordance with the received remote control command. While it is assumed in the present embodiment that the remote operation program for remotely controlling MFP 100 is installed in mobile information device 200, the remote operation program for remotely controlling MFP 100 may be installed in PC 300. In such a case, a user can control MFP 100 remotely by using PC 300, as in the case of controlling MFP 100 remotely by using mobile information device 200.

Figure 3:
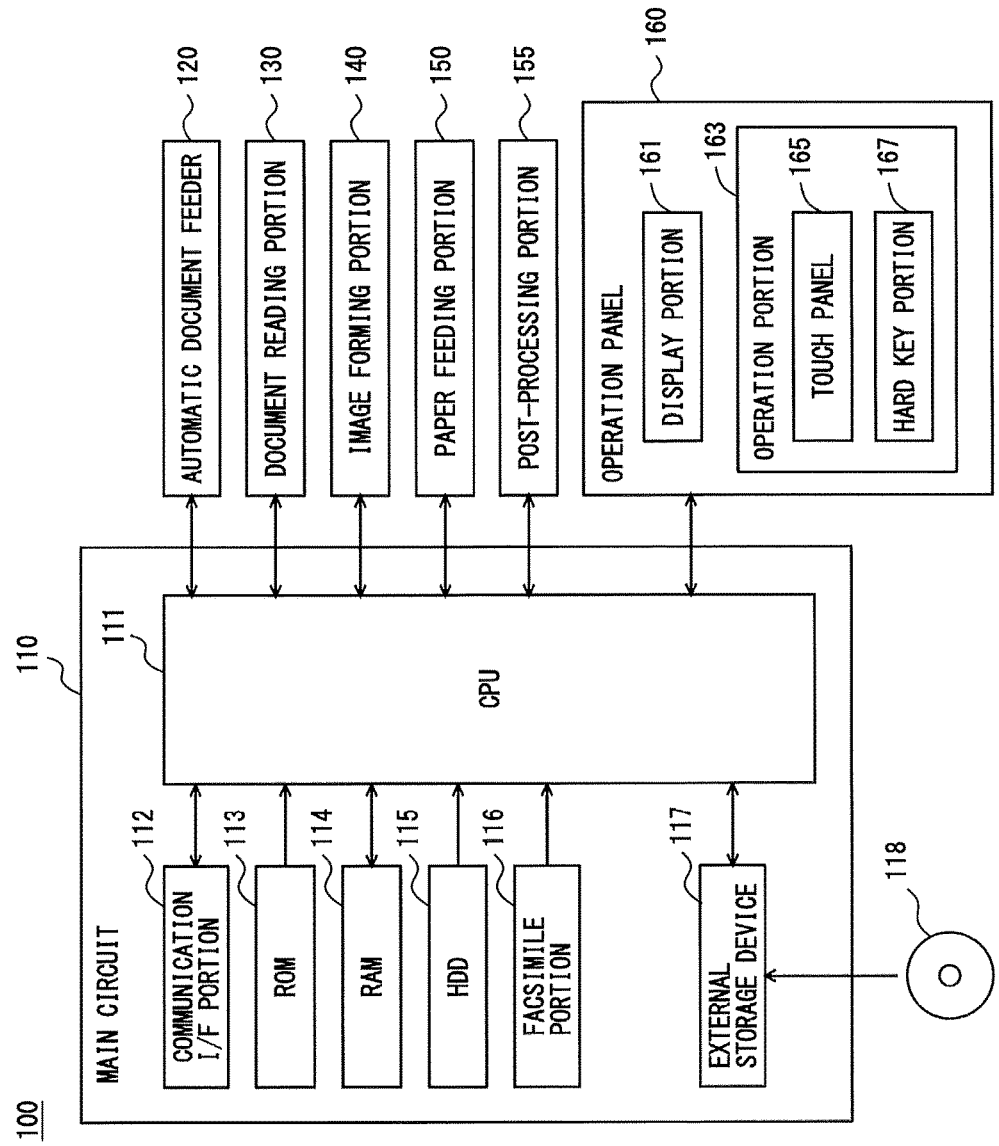
FIG. 3 is a block diagram schematically showing the hardware configuration of the MFP.

FIG. 2 is a perspective view of the MFP. FIG. 3 is a block diagram schematically showing the hardware configuration of the MFP. Referring to FIGS. 2 and 3, MFP 100 includes: a main circuit 110; a document reading portion 130 which reads a document; an automatic document feeder 120 which feeds a document to document reading portion 130; an image forming portion 140 which forms an image on a sheet of paper or the like on the basis of image data output from document reading portion 130 that has read a document; a paper feeding portion 150 which supplies sheets of paper to image forming portion 140; a post-processing portion 155 which processes sheets of paper on which images have been formed; and an operation panel 160 serving as a user interface.

Post-processing portion 155 performs a sorting process of sorting and discharging one or more sheets of paper on which images have been formed by image forming portion 140, a hole-punching process of punching the sheets, and a stapling process of stapling the sheets.

Main circuit 110 includes a central processing unit (CPU) 111, a communication interface (I/F) portion 112, a read only memory (ROM) 113, a random access memory (RAM) 114, a hard disk drive (HDD) 115 as a mass storage, a facsimile portion 116, and an external storage device 117 on which a compact disc ROM (CD-ROM) 118 is mounted. CPU 111 is connected with automatic document feeder 120, document reading portion 130, image forming portion 140, paper feeding portion 150, post-processing portion 155, and operation panel 160, and is responsible for overall control of MFP 100.

ROM 113 stores a program executed by CPU 111 or data necessary for execution of the program. RAM 114 is used as a work area when CPU 111 executes a program. Further, RAM 114 temporarily stores read data (image data) continuously transmitted from document reading portion 130.

Operation panel 160, which is provided on an upper surface of MFP 100, includes a display portion 161 and an operation portion 163. Display portion 161 is a display such as a liquid crystal display (LCD) or an organic electroluminescence display (ELD), and displays an instruction menu for the user, information about acquired image data, and others. Operation portion 163 includes a hard key portion 167 having a plurality of keys, and accepts input data, such as instructions, characters, and numerical characters, according to the key operations by the user. Operation portion 163 further includes a touch panel 165 disposed on display portion 161.

Communication I/F portion 112 is an interface for connecting MFP 100 to network 3. CPU 111 communicates with PC 300 or mobile information device 200 via communication I/F portion 112 for data transmission/reception. Further, communication I/F portion 112 is able to communicate with a computer connected to the Internet via network 3.

Facsimile portion 116 is connected to public switched telephone networks (PSTN), and transmits facsimile data to or receives facsimile data from the PSTN. Facsimile portion 116 stores the received facsimile data into HDD 115, or outputs the data to image forming portion 140. Image forming portion 140 prints on a sheet of paper the facsimile data received by facsimile portion 116 Further, facsimile portion 116 converts the data stored in HDD 115 to facsimile data, and transmits the facsimile data to a facsimile machine connected to the PSTN.

External storage device 117 is mounted with CD-ROM 118. CPU 111 is capable of accessing CD-ROM 118 via external storage device 117. CPU 111 loads the program stored in CD-ROM 118 which is mounted on external storage device 117, into RAM 114 for execution. It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Further, the program executed by CPU 111 is not restricted to the program stored in CD-ROM 118; a program stored in HDD 115 may be loaded into RAM 114 for execution. In this case, another computer connected to network 3 may rewrite the program stored in HDD 115 of MFP 100, or may additionally write a new program therein. Further, MFP 100 may download a program from another computer connected to network 3, and store the program in HDD 115. As used herein, the "program" includes, not only the program which CPU 111 can execute directly, but also a source program, a compressed program, an encrypted program, and others.

Figure 4:
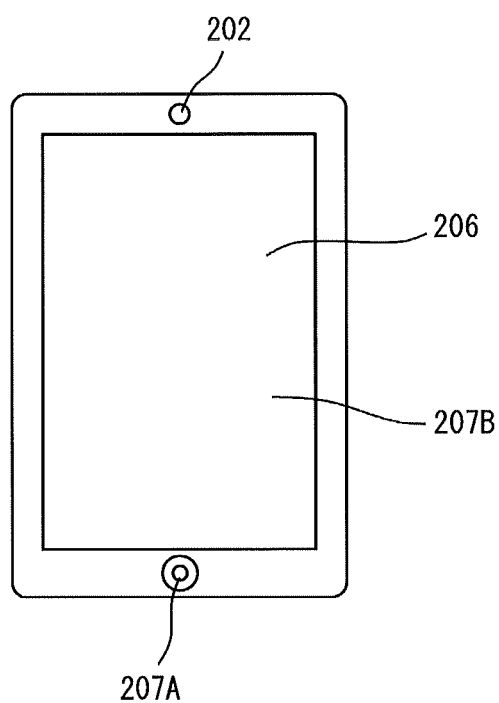
FIG. 4 is a front view of a mobile information device.
Figure 5:
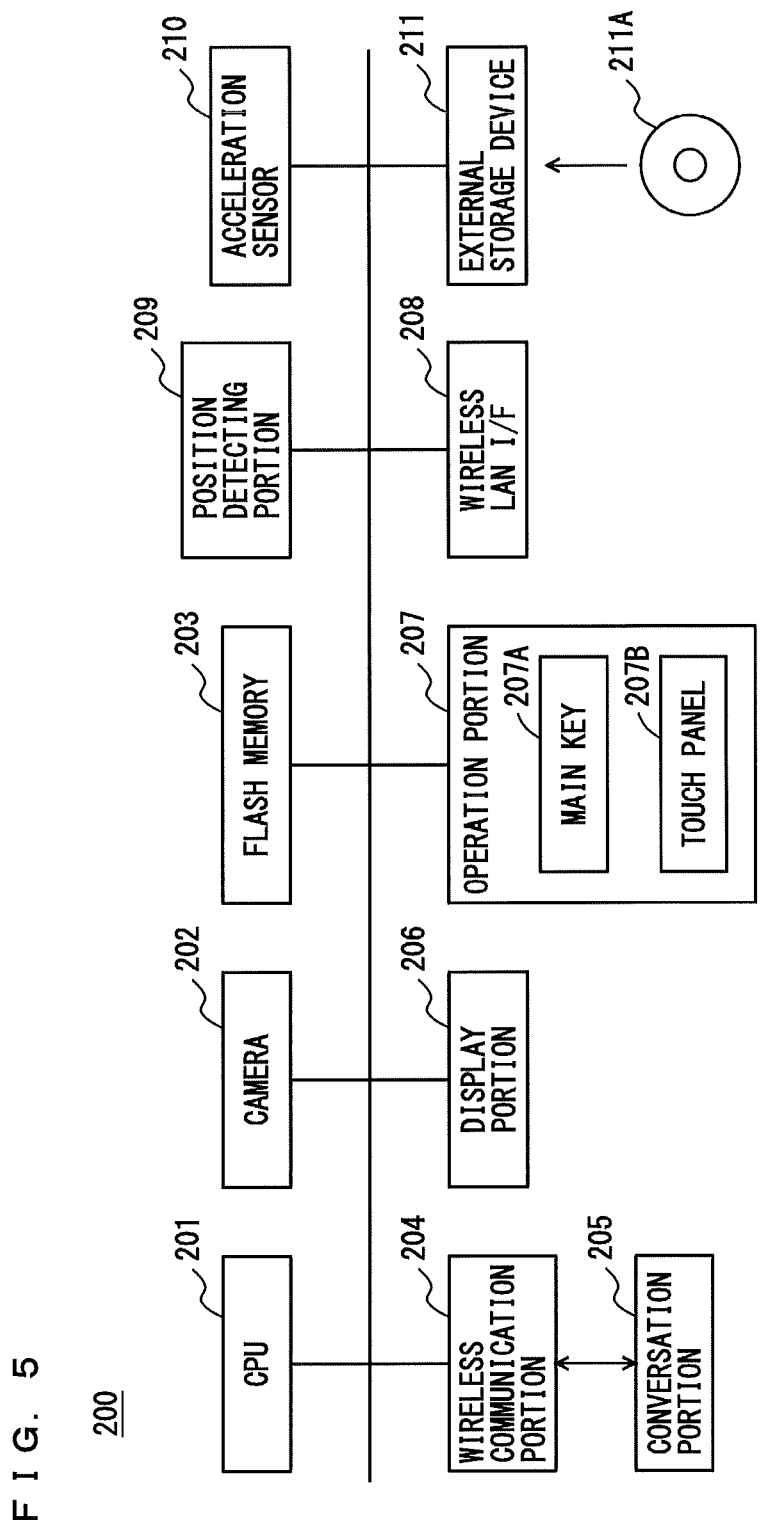
FIG. 5 is a block diagram schematically showing the hardware configuration of the mobile information device.

FIG. 4 is a front view of a mobile information device. FIG. 5 is a block diagram schematically showing the hardware configuration of the mobile information device. Referring to FIGS. 4 and 5, mobile information device 200 according to the present embodiment includes: a CPU 201 which is responsible for overall control of mobile information device 200; a camera 202; a flash memory 203 which stores data in a non-volatile manner; a wireless communication portion 204 which is connected to a conversation portion 205; a display portion 206 which displays information; an operation portion 207 which accepts operations by a user; a wireless LAN I/F 208; a position detecting portion 209; an acceleration sensor 210; and an external storage device 211.

Display portion 206 is a display such as an LCD or an organic ELD, and displays an instruction menu for the user, information about acquired image data, and others. Operation portion 207 includes a main key 207A and a touch panel 207B. When a user designates a position on the display surface of display portion 206, operation portion 207 outputs the position on the display surface detected by touch panel 207B, to CPU 201. CPU 201 detects the position designated by the user on the screen being displayed on display portion 206, on the basis of the position detected by touch panel 207B. CPU 201 accepts input data such as instructions, characters, and numerical characters corresponding to the operations by the user, on the basis of the screen being displayed on display portion 206 and the positions detected by touch panel 207B. For example, in the case where a screen including an image of the ten-key pad is displayed on display portion 206, CPU 201 accepts a number corresponding to the key that is displayed in the position detected by touch panel 207B.

Camera 202 is provided with a lens and a photoelectric conversion element. The lens collects light and focuses it onto the photoelectric conversion element, which in turn performs photoelectric conversion of the received light to output image data to CPU 201. The photoelectric conversion element includes a complementary metal oxide semiconductor (CMOS) sensor, a charge-coupled device (CCD) sensor, or the like. Camera 202 is placed such that its image pick-up range includes a user who views display portion 206. Specifically, camera 202 is arranged such that its optical axis is approximately parallel to the normal to the display surface of display portion 206, and that its image pick-up direction is the same as the direction in which the display surface faces. In other words, camera 202 has the image pick-up range in which a user viewing display portion 206 is included.

Wireless communication portion 204 communicates in a wireless manner with a mobile phone base station connected to a telephone communication network. Wireless communication portion 204 connects mobile information device 200 to the telephone communication network to enable a conversation using conversation portion 205. Wireless communication portion 204 decodes sound signals obtained by demodulating wireless signals received from the mobile phone base station, for output to conversation portion 205. Wireless communication portion 204 encodes sound input from conversation portion 205, and transmits it to the mobile phone base station. Conversation portion 205 has a microphone and a speaker, and outputs the sound input from wireless communication portion 204 from the speaker, and outputs the sound input from the microphone to wireless communication portion 204. Furthermore, wireless communication portion 204 is controlled by CPU 201, and connects mobile information device 200 to an e-mail server for transmission/reception of e-mail.

Wireless LAN I/F 208 is an interface for communicating with radio station 5 to connect mobile information device 200 to network 3. Internet protocol (IP) addresses of PC 300 and MFP 100 may be registered in advance in mobile information device 200, so that mobile information device 200 can communicate with PC 300 and MFP 100 for transmission/reception of data. While it is assumed in the present embodiment that mobile information device 200 uses wireless LAN I/F 208 to communicate with PC 300 and MFP 100, mobile information device 200 may use another communication method. Specifically, in the case where mobile information device 200, PC 300, and MFP 100 each have a Bluetooth (registered trademark) or other short range radio communication device, mobile information device 200 may communicate with PC 300 or MFP 100 on a one-to-one basis.

Flash memory 203 stores a program executed by CPU 201 or data necessary for execution of the program. CPU 201 loads a program, which is recorded on flash memory 203, into a RAM included in CPU 201, for execution.

Position detecting portion 209 detects a current position of mobile information device 200. Specifically, position detecting portion 209, which is a global positioning system (GPS) receiver, receives radio waves from a plurality of GPS satellites to measure a current position. Position detecting portion 209 outputs a value indicating the measured current position, a set of the latitude and longitude for example, to CPU 201.

Acceleration sensor 210 detects an acceleration of mobile information device 200. Acceleration sensor 210 outputs the detected acceleration to CPU 201.

External storage device 211 is detachably attached to mobile information device 200, and can be mounted with a CD-ROM 211A in which a remote operation program is stored. CPU 201 is capable of accessing CD-ROM 211A via external storage device 211. CPU 201 can load the remote operation program stored in CD-ROM 211A which is mounted on external storage device 211, into a RAM included in CPU 201, for execution.

While the program stored in flash memory 203 or CD-ROM 211A has been described as a program executed by CPU 201, another computer connected to network 3 may rewrite the program stored in flash memory 203, or may additionally write a new program therein. Further, mobile information device 200 may download a program from another computer connected to network 3. As used herein, the "program" includes, not only the program which CPU 201 can execute directly, but also a source program, a compressed program, an encrypted program, and others.

It is noted that the medium for storing the program executed by CPU 201 is not restricted to CD-ROM 211A. It may be an optical disc (MO, MD, or DVD), an IC card, an optical card, or a semiconductor memory such as a mask ROM, an EPROM, an EEPROM, or the like.

Figure 6:
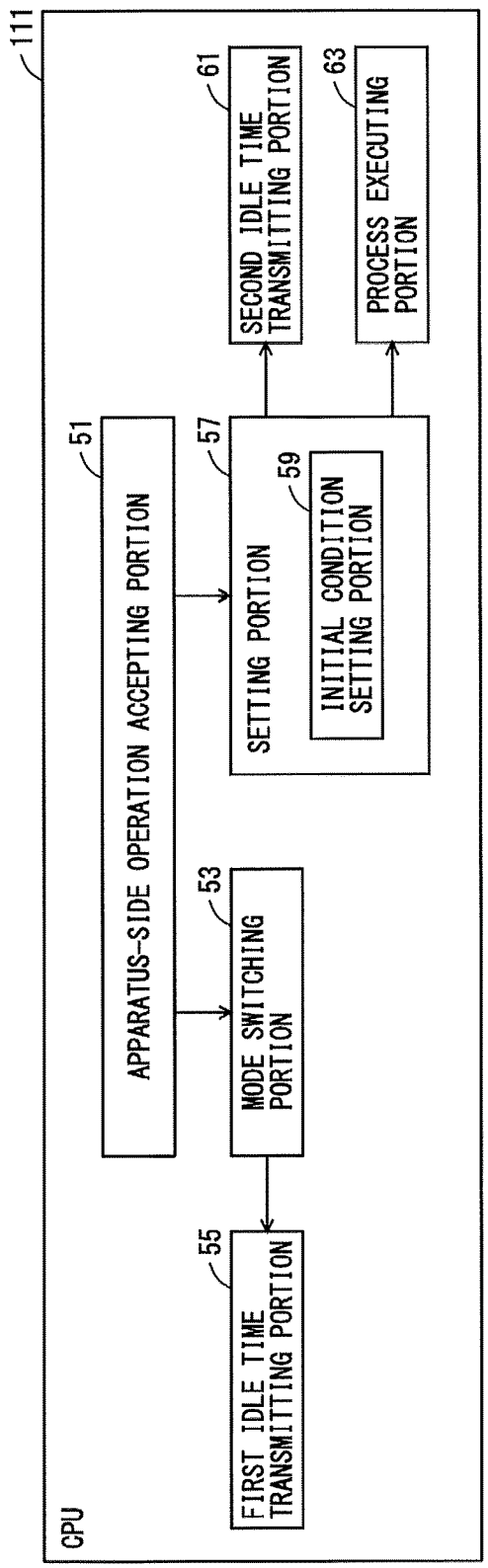
FIG. 6 is a block diagram showing, by way of example, the functions of a CPU included in the MFP according to a first embodiment of the present invention.

FIG. 6 is a block diagram showing, by way of example, the functions of a CPU included in the MFP according to the first embodiment. The functions shown in FIG. 6 are formed in CPU 111 included in MFP 100 as CPU 111 executes a remote control program stored in ROM 113, HDD 115, or CD-ROM 118. Referring to FIG. 6, CPU 111 includes: an apparatus-side operation accepting portion 51 which accepts a user operation; a mode switching portion 53 which switches operating modes; a first idle time transmitting portion 55; a process executing portion 63 which executes a process; a setting portion 57 which sets a set value for executing a process; and a second idle time transmitting portion 61.

Apparatus-side operation accepting portion 51 accepts an operation that a user inputs to MFP 100. In the case where a user uses mobile information device 200 to remotely control MFP 100, apparatus-side operation accepting portion 51 accepts a remote control command that communication I/F portion 112 receives from mobile information device 200. Apparatus-side operation accepting portion 51 outputs an accept command corresponding to the accepted remote control command, to setting portion 57. The remote control commands transmitted from mobile information device 200 include: a remote control command which is transmitted in response to an operation input by a user to mobile information device 200, and a dummy command which is transmitted irrespectively of an operation input by a user to mobile information device 200. The dummy command will be described in detail later. When apparatus-side operation accepting portion 51 accepts a remote control command, it outputs an operation acceptance signal to mode switching portion 53. The operation acceptance signal in this case is a signal indicating that a remote control command has been received.

In the case where a user operates operation panel 160, apparatus-side operation accepting portion 51 accepts an operation input by the user to operation panel 160, and outputs an accept command corresponding to the accepted operation, to setting portion 57. When apparatus-side operation accepting portion 51 accepts an operation input to operation panel 160, apparatus-side operation accepting portion 51 outputs an operation acceptance signal to mode switching portion 53. The operation acceptance signal in this case is a signal indicating that an operation input to operation panel 160 has been accepted.

Mode switching portion 53 switches the operating modes of MFP 100. The operating modes include a normal mode and a power saving mode in which less power is consumed than in the normal mode. In the normal mode, power is supplied to main circuit 110, automatic document feeder 120, document reading portion 130, image forming portion 140, paper feeding portion 150, post-processing portion 155, and operation panel 160, so that process executing portion 63 (described later) can immediately execute any processes. In the power saving mode, power is supplied to parts of main circuit 110, automatic document feeder 120, document reading portion 130, image forming portion 140, paper feeding portion 150, post-processing portion 155, and operation panel 160, and therefore, there are some processes that process executing portion 63 cannot execute immediately. For example, among the variety of power saving modes, least power is consumed in the mode in which power is supplied only to facsimile portion 116, communication I/F portion 112, and touch panel 165.

Mode switching portion 53 measures the time elapsed from when an operation acceptance signal was lastly input from apparatus-side operation accepting portion 51, and switches the operating mode from the normal mode to the power saving mode when the measured elapsed time has become a first idle time or more. When the first idle time or more has passed without accepting any operation, the mode is switched to the power saving mode. This can reduce the power consumed by MFP 100. The first idle time may be a predetermined value, or a user who administers MFP 100, for example, may set the value.

Communication I/F portion 112 establishes a communication session for communicating with another computer via network 3 when the operating mode is the normal mode. In the state where the communication session has been established, when the operating mode is switched from the normal mode to the power saving mode by mode switching portion 53, communication I/F portion 112 disconnects the communication session. For example, in the case where a mobile information device 200 remotely controls MFP 100, communication I/F portion 112 establishes a first communication session with mobile information portion 200. When the operating mode is switched to the power saving mode, communication I/F portion 112 disconnects the first communication session with mobile information device 200. After disconnecting the first communication session, when communication I/F portion 112 establishes a second communication session with a mobile information device 200, communication I/F portion 112 does not guarantee that mobile information device 200 with which the second communication session is established is identical to mobile information device 200 with which the first communication session was established previously.

First idle time transmitting portion 55 externally transmits the first idle time in response to a request from the outside. Specifically, when communication I/F portion 112 receives a first idle time transmission request from mobile information device 200 which is remotely controlling MFP 100, first idle time transmitting portion 55 acquires the first idle time from mode switching portion 53, and transmits the first idle time to mobile information device 200 via communication I/F portion 112.

Setting portion 57 receives an accept command from apparatus-side operation accepting portion 51, and sets operating conditions for process executing portion 63 to execute a process, on the basis of the accepted command. In the case where the accept command designates execution of a process, setting portion 57 causes process executing portion 63 to execute the process.

In process executing portion 63, initial conditions are predetermined as the operating conditions. Setting portion 57 sets the operating conditions by changing part of the initial conditions, in accordance with the accept command input from apparatus-side operation accepting portion 51.

Setting portion 57 includes an initial condition setting portion 59. Initial condition setting portion 59 measures the time elapsed from when an accept command was lastly input from apparatus-side operation accepting portion 51, and resets the operating conditions to the initial conditions when the measured elapsed time has become a second idle time or more. A user who uses MFP 100 determines initial conditions based on which the operating conditions are set. Accordingly, the user can set the operating conditions by changing part of the initial conditions. Even in the case where a user has terminated the operation in the course of setting the operating conditions, when the second idle time or more has passed since the termination of the operation, the operating conditions are reset to the initial conditions. This allows another user to set the operating conditions by changing part of the initial conditions. The second idle time may be a predetermined value, or a user who administers MFP 100, for example, may set the value.

Second idle time transmitting portion 61 externally transmits the second idle time in response to a request from the outside. Specifically, when communication I/F portion 112 receives a second idle time transmission request from mobile information device 200 which is remotely controlling MFP 100, second idle time transmitting portion 61 acquires the second idle time from setting portion 57, and transmits the second idle time to mobile information device 200 via communication I/F portion 112.

Process executing portion 63 executes processes in accordance with the operating conditions set by setting portion 57. The processes executed by process executing portion 63 include: a scanning process of controlling automatic document feeder 120 and document reading portion 130 to read an image of a document; an image forming process of controlling image forming portion 140, paper feeding portion 150, and post-processing portion 155 to form images on sheets of paper; a data management process of reading data from or writing data to HDD 115 or CD-ROM 118; a facsimile process of controlling facsimile portion 116 to transmit or receive facsimile data; and a data transmitting/receiving process of controlling communication I/F portion 112 to transmit or receive data. The processes executed by process executing portion 63 also include processes as combinations of two or more of the above processes. For example, the processes include: a copying process as a combination of the scanning process and the image forming process; a scan-to-transmit process, as a combination of the scanning process and the data transmitting process, of transmitting the image data obtained by reading a document image; and a scan-to-BOX process, as a combination of the scanning process and the data management process, of storing in HDD 115 the image data obtained by reading a document image.

Figure 7:
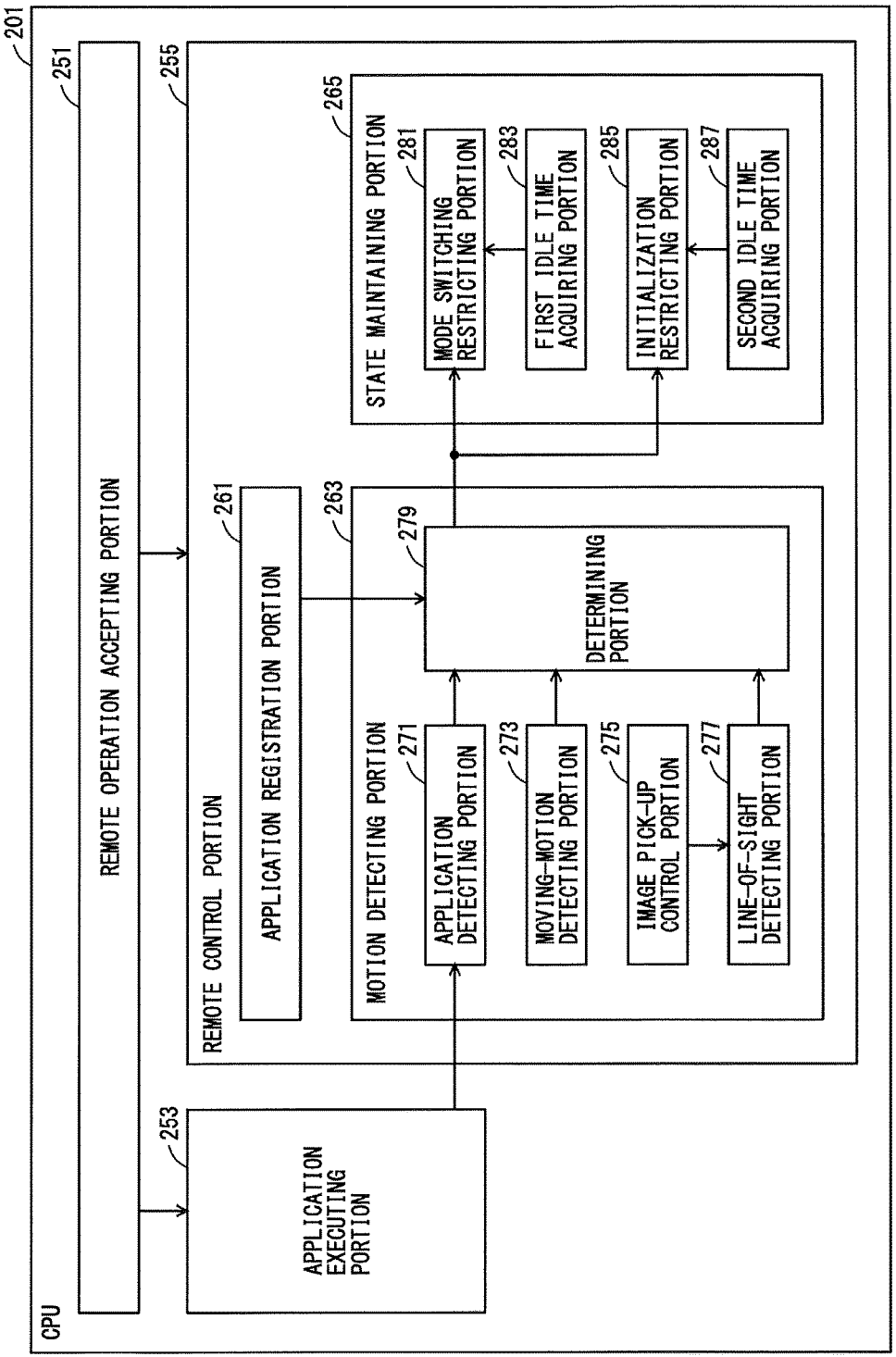
FIG. 7 is a block diagram showing, by way of example, the functions of a CPU included in the mobile information device according to the first embodiment.

FIG. 7 is a block diagram showing, by way of example, the functions of a CPU included in the mobile information device according to the first embodiment. The functions shown in FIG. 7 are formed in CPU 201 included in mobile information device 200 as CPU 201 executes a program stored in flash memory 203 or CD-ROM 211A. Referring to FIG. 7, CPU 201 includes: a remote operation accepting portion 251 which accepts a user operation; an application executing portion 253 which executes an application program; and a remote control portion 255 which remotely controls MFP 100.

Remote operation accepting portion 251 is part of a task for CPU 201 to execute an operation program. Remote operation accepting portion 251 accepts an operation input by a user to operation portion 207. Remote operation accepting portion 251 outputs the accepted operation to one of application executing portion 253 and remote control portion 255 which is in a currently selected state. Remote operation accepting portion 251 sets one of application executing portion 253 and remote control portion 255 to the currently selected state, in accordance with an operation input by the user to operation portion 207. The operation accepted by remote operation accepting portion 251 as a user inputs it to operation portion 207 includes an operation of switching tasks.

Application executing portion 253 is a task for CPU 201 to execute an application program. In the case where remote operation accepting portion 251 accepts an operation of designating one of one or more application programs stored in flash memory 203, application executing portion 253 executes the designated application program. For example, the application programs include, but are not limited to, a browsing program for a user to view Web pages stored in a Web server connected to the Internet, a file management program for a user to view data stored in flash memory 203 or CD-ROM 211A, a text editing program for a user to edit text, a spreadsheet program, and a mail management program for a user to view, transmit, and receive e-mail.

Application executing portion 253 is capable of executing a plurality of application programs in parallel.

Remote control portion 255 is a task for CPU 201 to execute a remote operation program. Remote control portion 255 receives, from remote operation accepting portion 251, an operation input by a user to operation portion 207. Remote control portion 255 remotely controls MFP 100 in accordance with the operation received from remote operation accepting portion 251. More specifically, remote control portion 255 transmits a remote control command, corresponding to the operation received from remote operation accepting portion 251, to MFP 100 via wireless LAN I/F 208. Remote control portion 255 includes an application registration portion 261, a motion detecting portion 263, and a state maintaining portion 265.

Application registration portion 261 registers a related program. The related program refers to an application program which is likely to be executed while a user is performing an operation of remotely controlling MFP 100. Application registration portion 261 registers an application program designated by a user, as a related program. For example, when a user designates one of the one or more application programs stored in flash memory 203 or CD-ROM 211A, application registration portion 261 registers the designated application program as the related program. It may also be configured such that, in the remote operation program, a predetermined application program is registered as a related program. In this case, although an application program not stored in flash memory 203 or CD-ROM 211A is registered as a related program, at the stage when the application program is installed into mobile information device 200, a user does not have to do anything for registering it as the related program. Further, some of the application programs executed by application executing portion 253 may download and install another application program from a server. When such another application program that is automatically installed as the application program is executed is predetermined to be a related program in the remote operation program, then the application program that is installed without the user's knowledge can be registered as the related program. Application registration portion 261 stores a related program table including the application identification information for identifying the related program in flash memory 203, and outputs the application identification information of the related program to motion detecting portion 263.

FIG. 8 shows an example of a related program table. Referring to FIG. 8, the related program table includes four related records each including the application identification information of a related program. Specifically, the related record No. 1 includes application identification information "browsing program", the related record No. 2 includes application identification information "address book", the related record No. 3 includes application identification information "image editing program", and the related record No. 4 includes application identification information "SNS program".

The application program with the application identification information "browsing program" is a program for a user to view Web pages stored in a server connected to the Internet. When a user is in the process of performing settings for remotely controlling MFP 100 to cause it to execute an image forming process, the user can effectively use this program to perform an operation of setting a whole or part of a Web page as an object to be printed.

The application program with the application identification information "address book" is a program for a user to search within an address book stored in mobile information device 200. When a user is in the process of performing settings for remotely controlling MFP 100 to execute a FAX transmitting process or e-mail transmitting process, the user may use this program to perform an operation of searching for the address information registered in the address book.

The application program with the application identification information "image editing program" is a program for a user to search the image data stored in mobile information device 200. When a user is in the process of performing settings for remotely controlling MFP 100 to cause it to execute an image forming process, the user may use this program to perform an operation of setting, as an object to be printed, the image data stored in mobile information device 200.

The application program with the application identification information "SNS program" is a program for a user to receive a social network service (SNS). When a user is in the process of performing settings for remotely controlling MFP 100 to cause it to execute an image forming process, the user may use this program to perform an operation of setting, as an object to be printed, the data stored in a server provided by the social network service.

Returning to FIG. 7, motion detecting portion 263 receives application identification information of a related program from application registration portion 261, and detects a user's motion of performing an operation which is related to the task of executing the related program. Motion detecting portion 263 includes: an application detecting portion 271 which detects an application program being executed by CPU 201; a moving-motion detecting portion 273 which detects a user's moving motion; an image pick-up control portion 275 which controls camera 202; a line-of-sight detecting portion 277; and a determining portion 279.

Application detecting portion 271 detects an application program being executed by application executing portion 253. More specifically, application detecting portion 271 acquires an application program being executed by CPU 201, from the operating system executed by CPU 201. Application executing portion 253 may execute a plurality of application programs in parallel. In the case where application executing portion 253 is executing a plurality of application programs in parallel, application detecting portion 271 detects, from the operating system executed by CPU 201, an application program which is being executed by the task in the currently selected state. Hereinafter, the application program that is executed by application executing portion 253 and that is executed by the currently selected task will be referred to as the "executing program". When detecting an executing program, application detecting portion 271 outputs application identification information for identifying the executing program, to determining portion 279. Application detecting portion 271 detects an executing program at prescribed time intervals, and, as long as an executing program is detected, application detecting portion 271 outputs the application identification information of the executing program to determining portion 279.

Moving-motion detecting portion 273 detects a user's moving motion. Specifically, moving-motion detecting portion 273 acquires an acceleration input from acceleration sensor 210, and detects the moving motion when the acceleration is not zero. While walking, a person repeatedly moves up and down. When the user is carrying mobile information device 200, acceleration sensor 210 repeatedly detects the upward and downward accelerations.

Further, moving-motion detecting portion 273 causes position detecting portion 209 to measure a current position, and acquires the current position output from position detecting portion 209. If two or more positions acquired at different times differ from each other, moving-motion detecting portion 273 detects the moving motion. In the case where moving-motion detecting portion 273 detects the moving motion on the basis of the acceleration input from acceleration sensor 210 or on the basis of the current position detected by position detecting portion 209, moving-motion detecting portion 273 outputs a moving signal indicating that the user is moving, to determining portion 279.

It should be noted that moving-motion detecting portion 273 may detect a moving motion only on the basis of the acceleration input from acceleration sensor 210. In this case, position detecting portion 209 becomes unnecessary. Moving-motion detecting portion 273 may detect a moving motion only on the basis of the current position detected by position detecting portion 209. In this case, acceleration sensor 210 becomes unnecessary.

Image pick-up control portion 275 controls camera 202 and acquires image data that camera 202 outputs by picking up an image of a subject. Specifically, image pick-up control portion 275 controls camera 202, in the state where an image is being displayed on display portion 206, and acquires image data that camera 202 outputs by picking up an image of a subject. Image pick-up control portion 275 outputs the image data acquired from camera 202, to line-of-sight detecting portion 277.

Line-of-sight detecting portion 277 analyzes the image data input from image pick-up control portion 275 to detect a line of sight of the user. If the detected line of sight of the user is in the direction of the display surface of display portion 206, line-of-sight detecting portion 277 outputs a viewing signal indicating that the user is viewing display portion 206, to determining portion 279. The technique of detecting a line of sight from an image is well known. For example, an area of skin color is extracted from the image as a face region, and from the face region, an eye region is extracted on the basis of the position of the eye in the face as well as the shape pattern and color of the eye. Since camera 202 is placed such that its optical axis is approximately parallel to the normal to the display surface of display portion 206, if the position of the pupil in the eye region is approximately at the center in the lateral direction, it can be determined that the user's line of sight is in the direction of the display surface of display portion 206.

Determining portion 279 receives application identification information of a related program from application registration portion 261, application identification information of an executing program from application detecting portion 271, a moving signal from moving-motion detecting portion 273, and a viewing signal from line-of-sight detecting portion 277. Here, one or more pieces of application identification information of the related program(s) is/are input from application registration portion 261. Determining portion 279 determines whether the user's motion is a remote-operation motion for inputting a remote operation. When determining portion 279 determines that the user's motion is the remote-operation motion, determining portion 279 outputs a remote-operation motion signal, indicating that the user is in the remote-operation motion, to state maintaining portion 265.

Determining portion 279 compares the application identification information of the executing program with the one or more pieces of application identification information of the related program(s). When the same application identification information as that of the executing program is included in the piece(s) of application identification information of the related program(s), determining portion 279 detects the user's remote-operation motion. However, even in the case where the same application identification information as that of the executing program is included in the piece(s) of application identification information of the related program(s), if a moving signal is being input from moving-motion detecting portion 273, determining portion 279 does not detect the remote-operation motion. Further, in the case where the same application identification information as that of the executing program is included in the piece(s) of application identification information of the related program(s), as long as a viewing signal is being input from line-of-sight detecting portion 277, determining portion 279 detects the remote-operation motion even if the moving signal is being input from moving-motion detecting portion 273.

Application detecting portion 271 detects an executing program at prescribed time intervals, and, as long as an executing program is being detected, application detecting portion 271 outputs application identification information of the executing program to determining portion 279. Therefore, while the application identification information is being input from application detecting portion 271, determining portion 279 determines whether the user's motion is the remote-operation motion or not, at prescribed time intervals. More specifically, determining portion 279 determines whether the executing program is the related program or not, whether the moving signal is being input from moving-motion detecting portion 273 or not, and whether the viewing signal is being input from line-of-sight detecting portion 277 or not, at the prescribed time intervals. In the case where determining portion 279 determines that the user's motion is the remote-operation motion, determining portion 279 outputs a remote-operation motion signal to state maintaining portion 265 at the prescribed time interval.

State maintaining portion 265 includes a mode switching restricting portion 281, a first idle time acquiring portion 283, an initialization restricting portion 285, and a second idle time acquiring portion 287. First idle time acquiring portion 283 acquires a first idle time from MFP 100. Specifically, first idle time acquiring portion 283 controls wireless LAN I/F 208 to transmit a first idle time transmission request to MFP 100, and when wireless LAN I/F 208 receives the first idle time transmitted from MFP 100, first idle time acquiring portion 283 acquires the first idle time. First idle time acquiring portion 283 outputs the first idle time acquired from MFP 100, to mode switching restricting portion 281.

Mode switching restricting portion 281 receives an operation input by a user to operation portion 207 from remote operation accepting portion 251, a first idle time from first idle time acquiring portion 283, and a remote-operation motion signal from determining portion 279. Mode switching restricting portion 281 measures the time elapsed from when a last operation was input from remote operation accepting portion 251, and compares the elapsed time with the first idle time. As long as the remote-operation motion signal is being input from determining portion 279, mode switching restricting portion 281 controls wireless LAN I/F 208 to transmit a remote control command to MFP 100 before the elapsed time exceeds the first idle time. The remote control command that mode switching restricting portion 281 transmits to MFP 100 is a dummy command.

Second idle time acquiring portion 287 acquires a second idle time from MFP 100. Specifically, second idle time acquiring portion 287 controls wireless LAN I/F 208 to transmit a second idle time transmission request to MFP 100, and when wireless LAN I/F 208 receives the second idle time transmitted from MFP 100, second idle time acquiring portion 287 acquires the second idle time. Second idle time acquiring portion 287 outputs the second idle time acquired from MFP 100, to initialization restricting portion 285.

Initialization restricting portion 285 receives an operation input by a user to operation portion 207 from remote operation accepting portion 251, a second idle time from second idle time acquiring portion 287, and a remote-operation motion signal from determining portion 279. Initialization restricting portion 285 measures the time elapsed from when a last operation was input from remote operation accepting portion 251, and compares the elapsed time with the second idle time. As long as the remote-operation motion signal is being input from determining portion 279, initialization restricting portion 285 controls wireless LAN I/F 208 to transmit a remote control command to MFP 100 before the elapsed time exceeds the second idle time. The remote control command that initialization restricting portion 285 transmits to MFP 100 is a dummy command.

While it is assumed in the present embodiment that the remote control command transmitted to MFP 100 from each of mode switching restricting portion 281 and initialization restricting portion 285 is a dummy command, it may be any type of remote control command as long as MFP 100 can receive it and as long as it will not affect a process when MFP 100 executes the process corresponding to the remote control command. For example, the dummy command may be a remote control command indicating that, on a remote control screen displayed on display portion 206, a portion not associated with any execution button or other control has been designated, or may be a remote control command indicating that, on the remote control screen, an area for inputting a set value has been designated.

Figure 9:
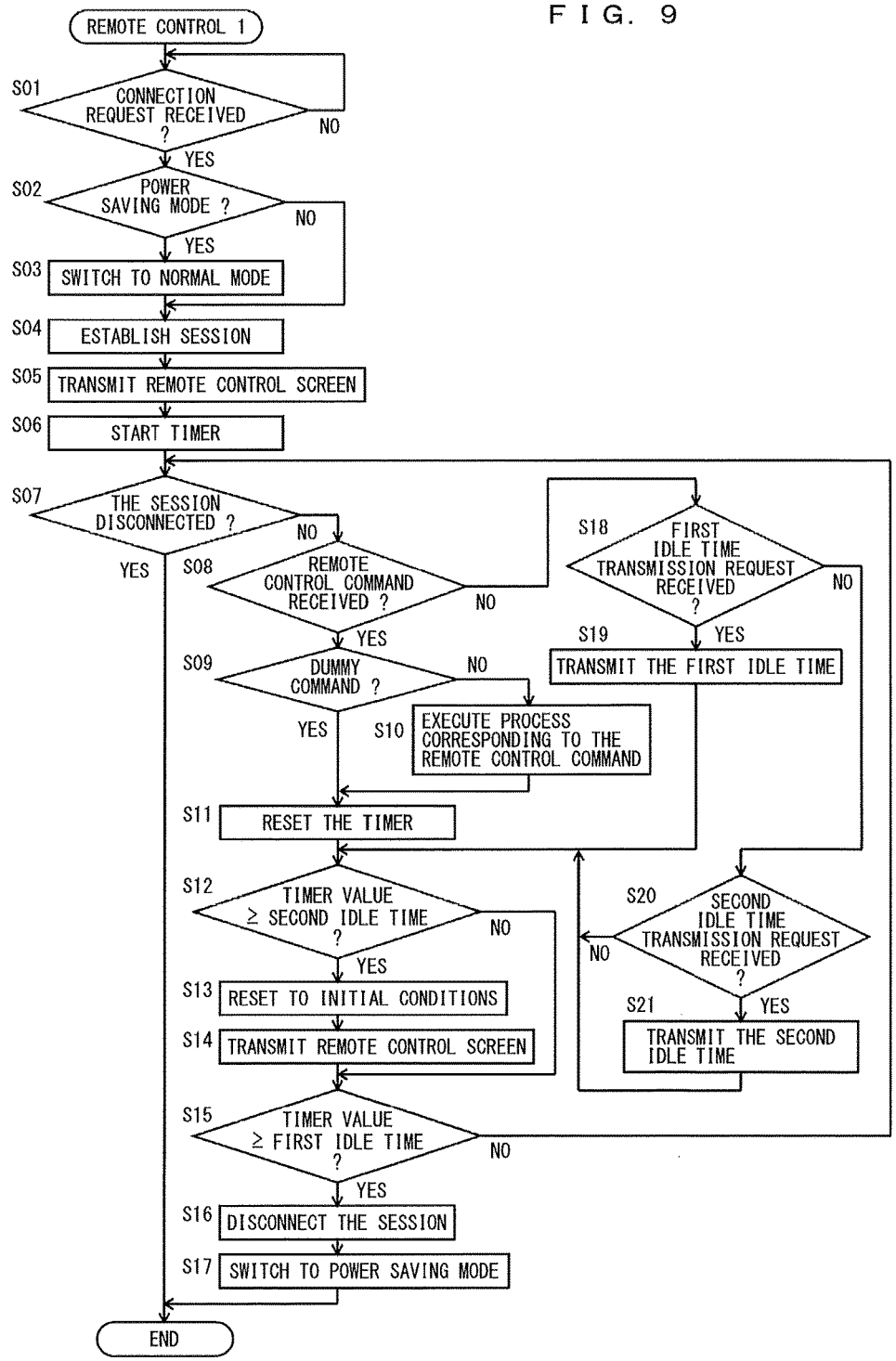
FIG. 9 is a flowchart illustrating an example of the flow of a remote control process according to the first embodiment.

FIG. 9 is a flowchart illustrating an example of the flow of a remote control process according to the first embodiment. The remote control process is carried out by CPU 111 included in MFP 100 as CPU 111 executes a remote control program stored in ROM 113, HDD 115, or CD-ROM 118.

Referring to FIG. 9, CPU 111 determines whether a connection request has been received (step S01). CPU 111 is in a standby mode until communication I/F portion 112 receives a session connection request from the outside (NO in step S01), and once the connection request is received, the process proceeds to step S02. It is here assumed that a connection request is received from mobile information device 200.

In step S02, CPU 111 determines whether the operating mode has been set to the power saving mode. If the operating mode has been set to the power saving mode, the process proceeds to step S03. If it has been set to the normal mode, the process proceeds to step S04. In step S03, CPU 111 switches the operating mode to the normal mode, and the process proceeds to step S04.

In step S04, CPU 111 establishes a session for communication. CPU 111 then transmits a remote control screen to the device with which the session has been established, i.e. mobile information device 200 here (step S05). In the following step S06, CPU 111 starts a timer. The timer measures the time elapsed from when a remote control command was received lastly.

In step S07, CPU 111 determines whether the session established in step S04 has been disconnected by mobile information device 200. If so, the process is terminated; otherwise, the process proceeds to step S08.

In step S08, CPU 111 determines whether a remote control command has been received. If communication I/F portion 112 has received a remote control command from mobile information device 200 to which the remote control screen was transmitted, the process proceeds to step S09; otherwise, the process proceeds to step S18. In step S09, CPU 111 determines whether the remote control command is a dummy command. The dummy command is a command that has been predetermined with the remote operation program installed in mobile information device 200. If the remote control command is a dummy command, the process proceeds to step S11; otherwise, the process proceeds to step S10. In step S10, CPU 111 executes a process determined corresponding to the remote control command, and the process proceeds to step S11. The process determined corresponding to the remote control command includes a process of setting operating conditions and a process of executing a process in accordance with the operating conditions. In step S11, CPU 111 resets the timer, and the process proceeds to step S12. Specifically, the timer value is set to "0".

In step S12, CPU 111 compares the timer value with the second idle time. If the timer value is equal to or greater than the second idle time, the process proceeds to step S13; otherwise, the process proceeds to step S15. In step S13, CPU 111 resets the operating conditions to initial conditions, and the process proceeds to step S14. In the case where the second idle time has passed without receiving a remote control command, the operating conditions are set to the initial conditions. This allows the user of mobile information device 200 to input settings for the operating conditions from the initial conditions.

In step S14, CPU 111 transmits a remote control screen to mobile information device 200, as in step S05. The remote control screen transmitted at this stage is the remote control screen with the operating conditions set to the initial conditions. Therefore, in the case where the remote control screen includes an area for displaying a set value for setting an operating condition, the set value determined as the initial condition is displayed in the area.

In step S15, CPU 111 compares the timer value with the first idle time. If the timer value is equal to or greater than the first idle time, the process proceeds to step S16; otherwise, the process returns to step S07. In step S16, CPU 111 disconnects the session, and the process proceeds to step S17. In the case where the first idle time has passed without receiving a remote control command, CPU 111 determines that the user of mobile information device 200 has finished the remote operation of MFP 100. This is for preventing the undesirable situation where another user cannot use MFP 100. In step S17, CPU 111 switches the operating mode to the power saving mode, and the process is terminated.

On the other hand, in step S18, CPU 111 determines whether a first idle time transmission request has been received. If communication I/F portion 112 has received a first idle time transmission request from mobile information device 200, the process proceeds to step S19; otherwise, the process proceeds to step S20. In step S19, CPU 111 transmits the first idle time to mobile information device 200 via communication I/F portion 112, and the process proceeds to step S12.

In step S20, CPU 111 determines whether a second idle time transmission request has been received. If communication I/F portion 112 has received a second idle time transmission request from mobile information device 200, the process proceeds to step S21; otherwise, the process proceeds to step S12. In step S21, CPU 111 transmits the second idle time to mobile information device 200 via communication I/F portion 112, and the process proceeds to step S12.

Figure 10:
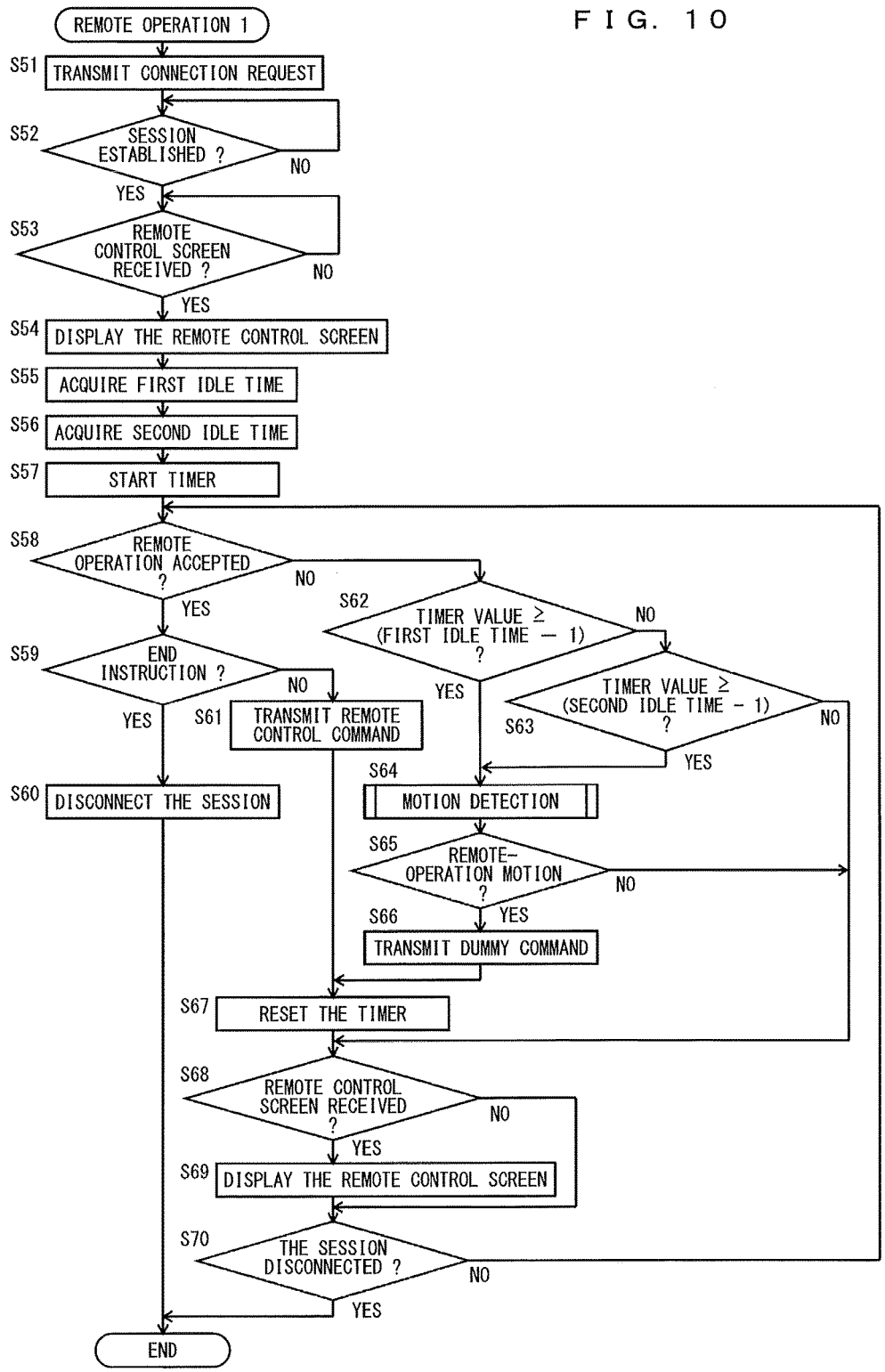
FIG. 10 is a flowchart illustrating an example of the flow of a remote operation process according to the first embodiment.

FIG. 10 is a flowchart illustrating an example of the flow of a remote operation process according to the first embodiment. The remote operation process is carried out by CPU 201 included in mobile information device 200 as CPU 201 executes a remote operation program stored in flash memory 203 or CD-ROM 211A. Referring to FIG. 10, CPU 201 transmits a connection request to MFP 100 (step S51). Specifically, CPU 201 controls wireless LAN I/F 208 to transmit a connection request for a communication session to MFP 100. CPU 201 then determines whether a session has been established (step S52). Specifically, CPU 201 negotiates with MFP 100 to establish a session. CPU 201 is in a standby mode until a session is established (NO in step S52), and once the session is established (YES in step S52), the process proceeds to step S53.

In step S53, CPU 201 is in a standby mode until a remote control screen is received, and once the remote control screen is received, the process proceeds to step S54. When a communication session is established, MFP 100 transmits the remote control screen. CPU 201 receives the remote control screen by controlling wireless LAN I/F 208. CPU 201 then displays the received remote control screen on display portion 206 (step S54).

In the following step S55, CPU 201 acquires a first idle time. Specifically, CPU 201 controls wireless LAN I/F 208 to transmit a first idle time transmission request to MFP 100 and receive the first idle time that MFP 100 returns. Next, CPU 201 acquires a second idle time (step S56). Specifically, CPU 201 controls wireless LAN I/F 208 to transmit a second idle time transmission request to MFP 100 and receive the second idle time that MFP 100 returns.

In step S57, CPU 201 starts a timer. The timer measures the time elapsed from when a remote control command was transmitted to MFP 100. In step S58, CPU 201 determines whether a remote operation has been accepted. An operation input by a user to operation portion 207 is accepted as the remote operation. If a remote operation has been accepted, the process proceeds to step S59; otherwise, the process proceeds to step S62.

In step S59, CPU 201 determines whether the remote operation accepted in step S58 is an end instruction. If so, the process proceeds to step S60; otherwise, the process proceeds to step S61. In step S60, CPU 201 disconnects the session established in step S52, and the process is terminated.

In step S61, CPU 201 controls wireless LAN I/F 208 to transmit a remote control command corresponding to the remote operation accepted in step S58, to MFP 100. The process then proceeds to step S67.

On the other hand, if it is determined in step S58 that a remote operation has not been accepted, in step S62, CPU 201 compares the timer value with the time obtained by subtracting one second from the first idle time. If the timer value is equal to or greater than the time obtained by subtracting one second from the first idle time, the process proceeds to step S64; otherwise, the process proceeds to step S63. In step S63, CPU 201 compares the timer value with the time obtained by subtracting one second from the second idle time. If the timer value is equal to or greater than the time obtained by subtracting one second from the second idle time, the process proceeds to step S64; otherwise, the process proceeds to step S68.

In step S64, CPU 201 carries out a motion detection process, and the process proceeds to step S65. The motion detection process, which will be described in detail later, is the process of determining whether the motion of the user of mobile information device 200 is a remote-operation motion related to the remote operation. In step S65, the process branches on the basis of the result of the motion detection process carried out in step S64. If the motion of the user of mobile information device 200 is the remote-operation motion, the process proceeds to step S66; otherwise, the process proceeds to step S68. In step S66, CPU 201 controls wireless LAN I/F 208 to transmit a dummy command to MFP 100, and the process proceeds to step S67.

In step S67, CPU 201 resets the timer, and the process proceeds to step S68. Specifically, the timer value is set to "0". In step S68, CPU 201 determines whether a remote control screen has been received. If so, the process proceeds to step S69; otherwise, the process proceeds to step S70. In step S69, CPU 201 displays the received remote control screen on display portion 206, and the process proceeds to step S70.

In step S70, CPU 201 determines whether the session established in step S52 has been disconnected by MFP 100. If so, the process is terminated; otherwise, the process returns to step S58.

Figure 11:
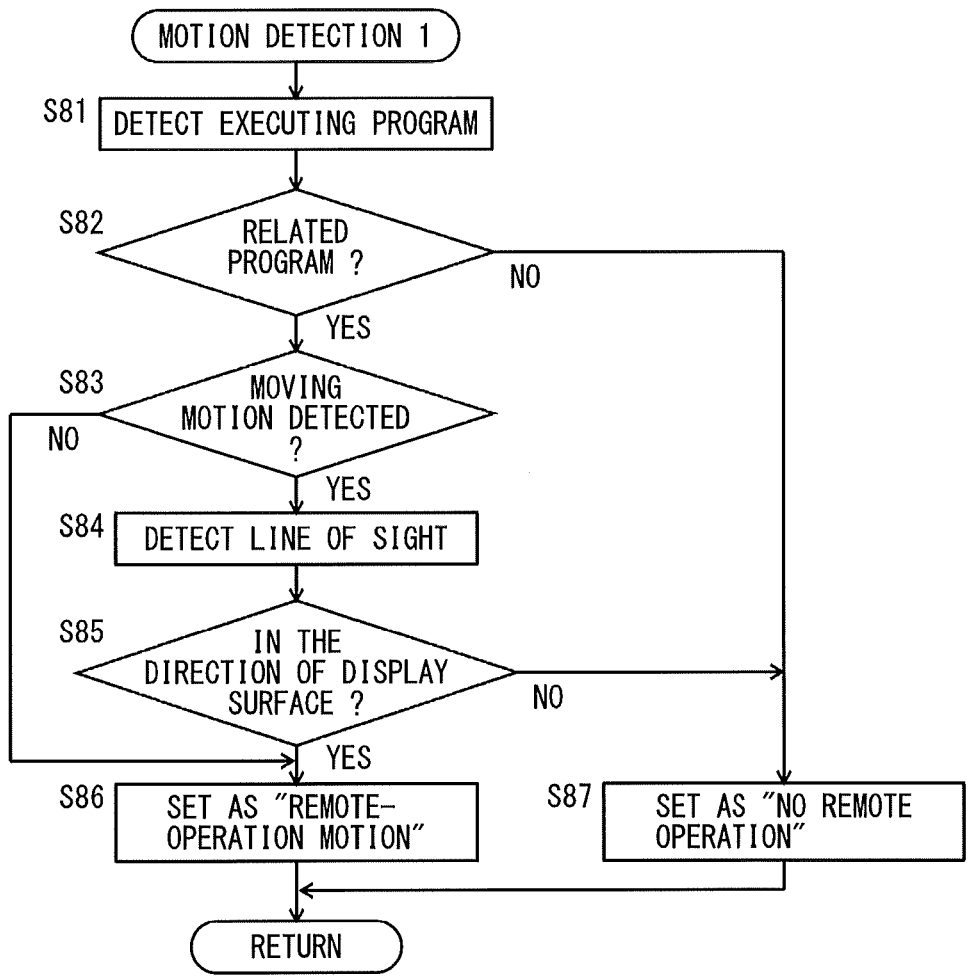
FIG. 11 is a flowchart illustrating an example of the flow of a motion detection process according to the first embodiment.

FIG. 11 is a flowchart illustrating an example of the flow of a motion detection process according to the first embodiment. The motion detection process is carried out in step S64 of the remote operation process shown in FIG. 10. Referring to FIG. 11, CPU 201 detects an application program being executed by CPU 201, as an executing program (step S81). Specifically, CPU 201 acquires, from the operating system executed by CPU 201, the application program being executed by CPU 201. In the case where two or more application programs are being executed by CPU 201 in parallel, CPU 201 acquires, from the operating system executed by CPU 201, the application program which is being executed by the task in the currently selected state.

CPU 201 then determines whether the detected executing program is a related program (step S82). Specifically, CPU 201 refers to the related program table stored in flash memory 203, and if the application identification information of the executing program is registered in the related program table, CPU 201 determines that the executing program is the related program. If the executing program is the related program, the process proceeds to step S83; otherwise, the process proceeds to step S87.

In step S83, CPU 201 determines whether a moving motion has been detected. Specifically, CPU 201 determines whether the user is moving or not, on the basis of the acceleration detected by acceleration sensor 210 or a change in current position detected by position detecting portion 209. If it is determined that the user is moving, CPU 201 detects the moving motion. If the moving motion has been detected, the process proceeds to step S84; otherwise, the process proceeds to step S86.

In step S84, CPU 201 detects the user's line of sight. CPU 201 controls camera 202 to cause it to pick up an image of a subject, and analyzes the image data output from camera 202 to detect the user's line of sight. More specifically, CPU 201 extracts an eye region from the image of the image data, and detects the line of sight on the basis of the shape of the eye region, the position of the pupil, and so on. In step S85, CPU 201 determines whether the line of sight is in the direction of the display surface of display portion 206. When an eye region is extracted from the image and the pupil is at the center in the lateral direction, then CPU 201 determines that the line of sight is in the direction of the display surface of display portion 206. If the line of sight is in the direction of the display surface of display portion 206, the process proceeds to step S86; otherwise, the process proceeds to step S87.

In step S86, CPU 201 sets the user's motion as "remote-operation motion", and the process returns to the remote operation process. On the other hand, in step S87, CPU 201 sets the user's motion as "no remote operation", and the process returns to the remote operation process.

<First Modification>

Mobile information device 200 according to a first modification detects a remote-operation motion in the case where the user is viewing display portion 206. In the first modification, determining portion 279 in FIG. 7 detects the remote-operation motion as long as a viewing signal is being input from line-of-sight detecting portion 277. In this case, it is irrelevant whether an application program is being executed by application executing portion 253 or not, and it is irrelevant whether the user is moving or not. Accordingly, application executing portion 253, application registration portion 261, application detecting portion 271, and moving-motion detecting portion 273 become unnecessary.

<Second Modification>

Mobile information device 200 according to a second modification detects a remote-operation motion in the case where the user is not moving. In the second modification, determining portion 279 in FIG. 7 detects the remote-operation motion as long as no moving signal is being input from moving-motion detecting portion 273. In this case, it is irrelevant whether an application program is being executed by application executing portion 253 or not, and it is irrelevant whether the user is viewing display portion 206 or not. Accordingly, application executing portion 253, application registration portion 261, application detecting portion 271, image pick-up control portion 275, and line-of-sight detecting portion 277 become unnecessary.

<Third Modification>

Mobile information device 200 according to a third modification detects a remote-operation motion in the case where the user is not moving. Mobile information device 200 also detects a remote-operation motion in the case where the user is viewing display portion 206, even if the user is moving. In the third modification, determining portion 279 in FIG. 7 detects the remote-operation motion as long as no moving signal is being input from moving-motion detecting portion 273. Further, even in the case where the moving signal is being input from moving-motion detecting portion 273, as long as a viewing signal is being input from line-of-sight detecting portion 277, determining portion 279 detects the remote-operation motion. In this case, it is irrelevant whether an application program is being executed by application executing portion 253 or not. Accordingly, application executing portion 253, application registration portion 261, and application detecting portion 271 become unnecessary.

As described above, mobile information device 200 according to the first embodiment functions as an information processing apparatus, and includes remote operation accepting portion 251 which accepts a user operation, and remote control portion 255 which remotely controls MFP 100 on the basis of the accepted remote operation. Remote control portion 255 includes motion detecting portion 263 which detects a user's motion, and state maintaining portion 265 which controls MFP 100 not to change the operating state while a remote-operation motion for inputting a remote operation is detected by motion detecting portion 263 after a communication with MFP 100 has been established. Accordingly, it is possible to make the operating state of MFP 100 unchanged as long as the user is making a motion of remotely operating MFP 100, even if the user is not inputting a remote operation.

When CPU 201 is executing an application program, if the application program is a predetermined related program, the remote-operation motion is detected. This allows the user to execute the application program while remotely operating MFP 100. For example, while a user is executing a browsing program as an application program and performing an operation of designating the data downloaded from a Web server as the data for MFP 100 to form an image therefrom, the operating state of MFP 100 can be maintained. Further, while a user is executing an address book program as an application program and performing an operation of designating the destination of data, the operating state of MFP 100 can be maintained.

Mobile information device 200 further includes moving-motion detecting portion 273 which detects a user's moving motion, and detects a remote-operation motion on the condition that the moving motion is not detected. A user may move without terminating the remote operation. When a user starts moving while forgetting the termination operation, the control of making the operating state of MFP 100 unchanged is not carried out. This can improve the availability of MFP 100.

Further, mobile information device 200 includes line-of-sight detecting portion 277 which detects the user's line of sight on the basis of the image picked up by camera 202, and detects a remote-operation motion as long as the line of sight in the direction of display portion 206 is detected in the state where an image is displayed on display portion 206. The probability that the user is operating mobile information device 200 is high as long as the user's line of sight is in the direction of display portion 206 while an image is being displayed on display portion 206. This allows the user to continue the remote operation of MFP 100 while operating mobile information device 200.

In the state where MFP 100 has its operating mode switched to the normal mode, if the first idle time has passed without being remotely controlled, MFP 100 switches the operating mode from the normal mode to the power saving mode. However, mobile information device 200 includes mode switching restricting portion 281 which transmits a dummy command as a remote control command to MFP 100 before the first idle time passes from when a last remote operation was accepted. This makes it possible to maintain MFP 100 in the normal mode while the user is remotely operating MFP 100.

Further, if a predetermined second idle time has passed without being remotely controlled by mobile information device 200, MFP 100 sets the operating conditions to predetermined initial conditions. However, mobile information device 200 includes initialization restricting portion 285 which transmits a dummy command as a remote control command to MFP 100 before the second idle time passes from when a last remote operation was accepted. This makes it possible to maintain the operating conditions set in MFP 100 while the user is remotely operating MFP 100.

Second Embodiment

In print system 1 according to the first embodiment described above, mobile information device 200 which remotely controls MFP 100 transmits a dummy command to MFP 100 so as to prevent the operating mode from being switched to the power saving mode or the operating conditions from being reset in MFP 100. In a print system 1A according to a second embodiment of the present invention, it is configured such that MFP 100 can detect whether the motion of the user of mobile information device 200 is a remote-operation motion or not. In the following, print system 1A according to the second embodiment will be described, primarily focusing on the differences from print system 1 in the first embodiment described above.

Figure 12:
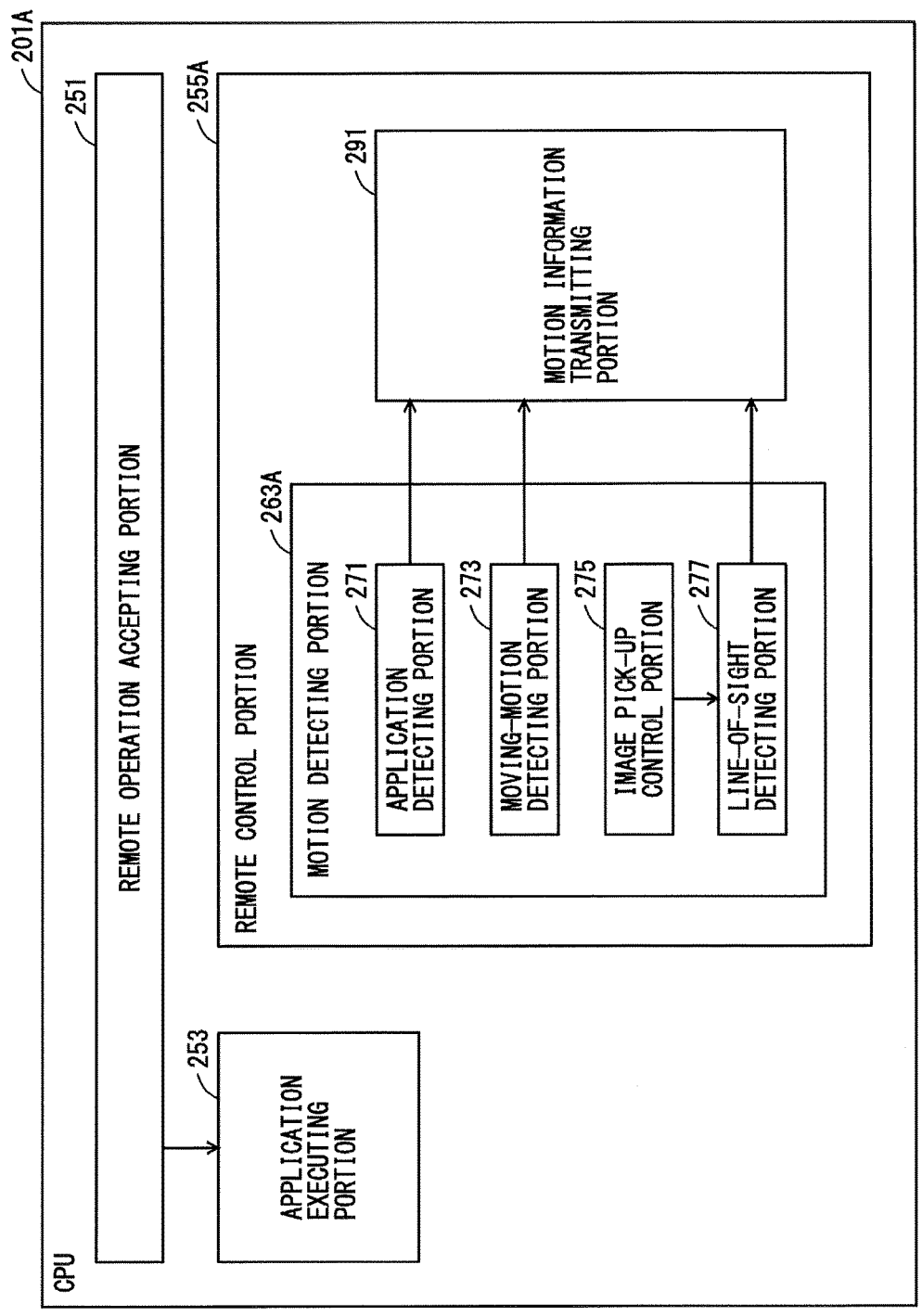
FIG. 12 is a block diagram showing, by way of example, the functions of a CPU included in the mobile information device according to a second embodiment of the present invention.

FIG. 12 is a block diagram showing, by way of example, the functions of a CPU included in the mobile information device according to the second embodiment. Referring to FIG. 12, the functions shown are different from those shown in FIG. 7 in that remote control portion 255 has been changed to a remote control portion 255A. The other functions are the same as those shown in FIG. 7, and thus, the description thereof will not be repeated here.

Remote control portion 255A is a task for CPU 201A to execute the remote operation program. Remote control portion 255A receives, from remote operation accepting portion 251, an operation input by a user to operation portion 207. Remote control portion 255A remotely controls MFP 100 in accordance with the operation received from remote operation accepting portion 251. More specifically, remote control portion 255A transmits a remote control command, corresponding to the operation received from remote operation accepting portion 251, to MFP 100 via wireless LAN I/F 208. Remote control portion 255A includes a motion detecting portion 263A and a motion information transmitting portion 291.

Motion detecting portion 263A detects a user's motion. Motion detecting portion 263A includes: an application detecting portion 271 which detects an application program being executed by CPU 201A; a moving-motion detecting portion 273 which detects a user's moving motion; an image pick-up control portion 275 which controls camera 202; and a line-of-sight detecting portion 277.

Application detecting portion 271 detects an application program being executed by application executing portion 253. More specifically, application detecting portion 271 acquires an application program being executed by CPU 201A from the operating system executed by CPU 201A. Application executing portion 253 may execute a plurality of application programs in parallel. In the case where application executing portion 253 is executing a plurality of application programs in parallel, application detecting portion 271 detects the application program which is being executed by the task in the currently selected state, from the operating system executed by CPU 201A. When detecting such an executing program, application detecting portion 271 outputs application identification information for identifying the executing program to motion information transmitting portion 291. Application detecting portion 271 detects an executing program at prescribed time intervals. As long as an executing program is being detected, application detecting portion 271 outputs the application identification information of the executing program to motion information transmitting portion 291.

Moving-motion detecting portion 273 detects a user's moving motion. Specifically, moving-motion detecting portion 273 acquires an acceleration input from acceleration sensor 210, and detects the moving motion when the acceleration is not zero. Further, moving-motion detecting portion 273 causes position detecting portion 209 to measure a current position, and acquires the current position output from position detecting portion 209. If two or more current positions acquired at different times differ from each other, moving-motion detecting portion 273 detects the moving motion. In the case where moving-motion detecting portion 273 detects the moving motion on the basis of the acceleration input from acceleration sensor 210 or on the basis of the current position detected by position detecting portion 209, moving-motion detecting portion 273 outputs a moving signal indicating that the user is moving, to motion information transmitting portion 291.

It should be noted that moving-motion detecting portion 273 may detect a moving motion only on the basis of the acceleration input from acceleration sensor 210. In this case, position detecting portion 209 becomes unnecessary. Moving-motion detecting portion 273 may detect a moving motion only on the basis of the current position detected by position detecting portion 209. In this case, acceleration sensor 210 becomes unnecessary.

Image pick-up control portion 275 controls camera 202 and acquires image data that camera 202 outputs by picking up an image of a subject. Specifically, image pick-up control portion 275 controls camera 202, while an image is being displayed on display portion 206, and acquires the image data that camera 202 outputs by picking up an image of the subject. Image pick-up control portion 275 outputs the image data acquired from camera 202, to line-of-sight detecting portion 277.

Line-of-sight detecting portion 277 analyzes the image data input from image pick-up control portion 275 to detect a line of sight of the user. If the detected line of sight of the user is in the direction of the display surface of display portion 206, line-of-sight detecting portion 277 outputs a viewing signal indicating that the user is viewing display portion 206, to motion information transmitting portion 291.

Motion information transmitting portion 291 receives application identification information of the executing program from application detecting portion 271, a moving signal from moving-motion detecting portion 273, and a viewing signal from line-of-sight detecting portion 277. While the application identification information of the executing program is being input from application detecting portion 271, motion information transmitting portion 291 transmits the application identification information to MFP 100 via wireless LAN I/F 208. While the moving signal is being input from moving-motion detecting portion 273, motion information transmitting portion 291 transmits the moving signal to MFP 100 via wireless LAN I/F 208. While the viewing signal is being input from line-of-sight detecting portion 277, motion information transmitting portion 291 transmits the viewing signal to MFP 100 via wireless LAN I/F 208. It may be configured such that motion information transmitting portion 291 transmits the application identification information, the moving signal, and the viewing signal in response to a request from MFP 100. Alternatively, it may be configured such that motion information transmitting portion 291 transmits the application identification information, the moving signal, and the viewing signal at prescribed time intervals as long as mobile information device 200 is remotely controlling MFP 100, or in other words, as long as the session with MFP 100 has been established.

Figure 13:
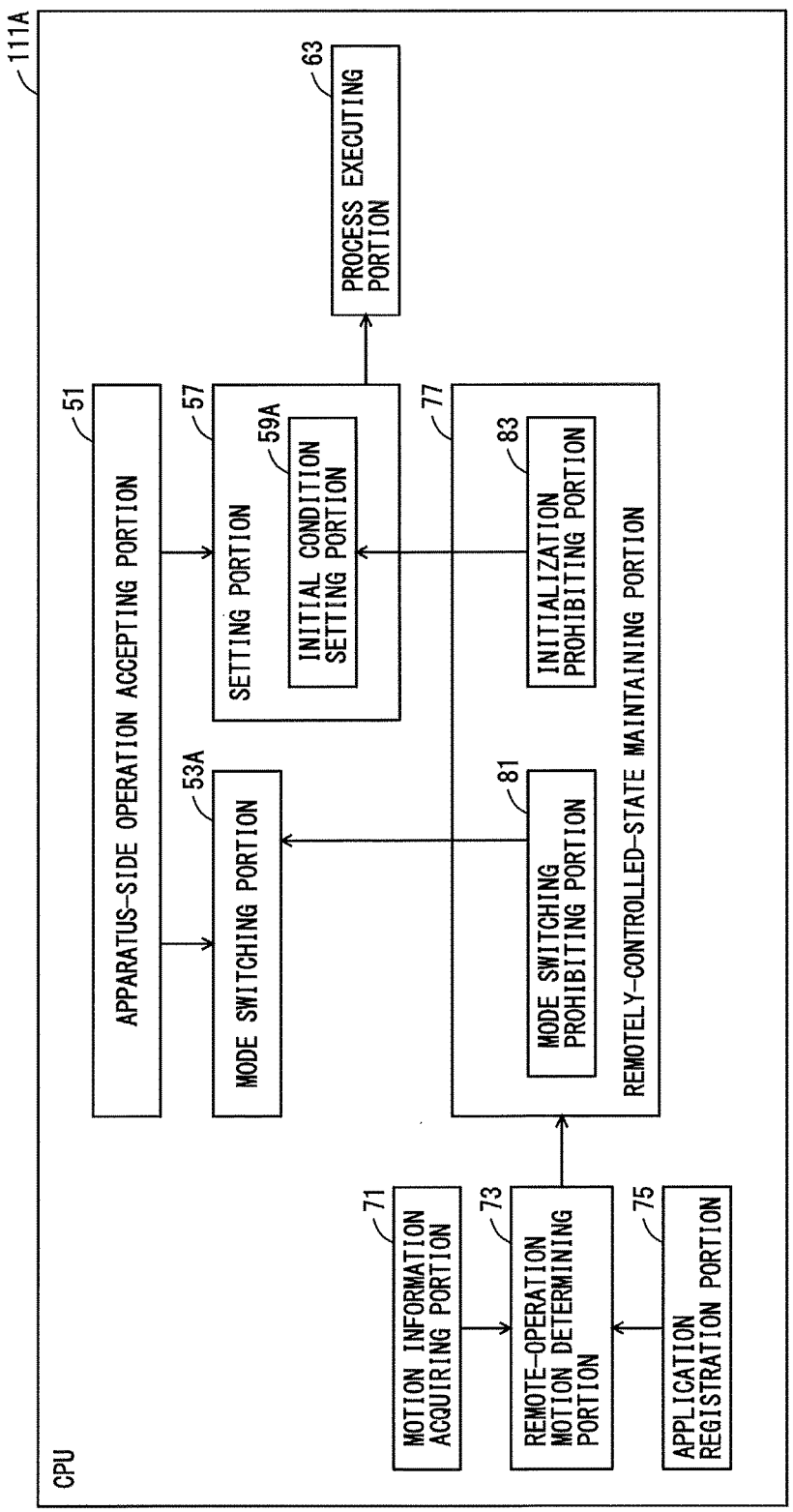
FIG. 13 is a block diagram showing, by way of example, the functions of a CPU included in the MFP according to the second embodiment.

FIG. 13 is a block diagram showing, by way of example, the functions of a CPU included in the MFP according to the second embodiment. Referring to FIG. 13, the functions shown are different from those shown in FIG. 6 in that mode switching portion 53 and initial condition setting portion 59 have been changed to a mode switching portion 53A and an initial condition setting portion 59A, respectively, that first idle time transmitting portion 55 and second idle time transmitting portion 61 have been removed, and that a motion information acquiring portion 71, a remote-operation motion determining portion 73, an application registration portion 75, and a remotely-controlled-state maintaining portion 77 have been added. The other functions are the same as those shown in FIG. 6, and thus, the description thereof will not be repeated here.

Application registration portion 75 registers a related program. The related program is an application program which is likely to be executed in mobile information device 200 while a user is remotely controlling MFP 100 with mobile information device 200. Application registration portion 75 registers the application program designated by a user, as a related program. For example, application registration portion 75 registers, as the related program, the application program specified by the application identification information that the user inputs to operation portion 163. It may also be configured such that, in the remote control program, a predetermined application program is registered as a related program. Application registration portion 75 stores a related program table including application identification information for identifying the related program in HDD 115, and outputs the application identification information of the related program to remote-operation motion determining portion 73. It is here assumed that the related program table shown in FIG. 8 is stored in HDD 115.

Motion information acquiring portion 71 acquires motion information from mobile information device 200. The motion information that mobile information device 200 of the second embodiment transmits includes application identification information, a moving signal, and a viewing signal. Motion information acquiring portion 71 outputs the received motion information to remote-operation motion determining portion 73.

Remote-operation motion determining portion 73 receives application identification information of a related program from application registration portion 75, and motion information from motion information acquiring portion 71. The motion information includes application identification information of an executing program, a moving signal, or a viewing signal. Remote-operation motion determining portion 73 determines whether the motion of the user operating mobile information device 200 is a remote-operation motion for inputting a remote operation. When remote-operation motion determining portion 73 determines that the user's motion is the remote-operation motion, remote-operation motion determining portion 73 outputs a remote-operation motion signal, indicating that the user is in the remote-operation motion, to remotely-controlled-state maintaining portion 77.

Remote-operation motion determining portion 73 compares the application identification information of the executing program, included in the motion information, with the one or more pieces of application identification information of the related program(s). If the same application identification information as that of the executing program is included in the piece(s) of application identification information of the related program(s), remote-operation motion determining portion 73 detects the user's remote-operation motion. Even in the case where the same application identification information as that of the executing program is included in the piece(s) of application identification information of the related program(s), if a moving signal is included in the motion information, remote-operation motion determining portion 73 does not detect the remote-operation motion. Further, in the case where the same application identification information as that of the executing program is included in the piece(s) of application identification information of the related program(s), if a viewing signal is included in the motion information, remote-operation motion determining portion 73 detects the remote-operation motion even if the moving signal is included in the motion information.

Remotely-controlled-state maintaining portion 77 includes a mode switching prohibiting portion 81 and an initialization prohibiting portion 83. Mode switching prohibiting portion 81 outputs a mode switching prohibiting signal to mode switching portion 53A while the remote-operation motion signal is being input from remote-operation motion determining portion 73. Initialization prohibiting portion 83 outputs an initialization prohibiting signal to initial condition setting portion 59A while the remote-operation motion signal is being input from remote-operation motion determining portion 73.

Mode switching portion 53A refrains from switching the operating mode from the normal mode to the power saving mode as long as the mode switching prohibiting signal is being input from mode switching prohibiting portion 81, even if the first idle time or more has passed from when an operation acceptance signal was input lastly from apparatus-side operation accepting portion 51. More specifically, while mode switching portion 53A measures the time elapsed from when the operation acceptance signal was lastly input from apparatus-side operation accepting portion 51, in the case where the mode switching prohibiting signal is input from mode switching prohibiting portion 81, mode switching portion 53A measures the time elapsed from when the mode switching prohibiting signal was input lastly.

Initial condition setting portion 59A refrains from resetting the operating conditions to the initial conditions as long as the initialization prohibiting signal is being input from initialization prohibiting portion 83, even if the second idle time or more has passed from when the operation acceptance signal was input lastly from apparatus-side operation accepting portion 51. More specifically, while initial condition setting portion 59A measure the time elapsed from when the operation acceptance signal was input lastly from apparatus-side operation accepting portion 51, in the case where the initialization prohibiting signal is input from initialization prohibiting portion 83, initial condition setting portion 59A measures the time elapsed from when the initialization prohibiting signal was input lastly.

Figure 14:
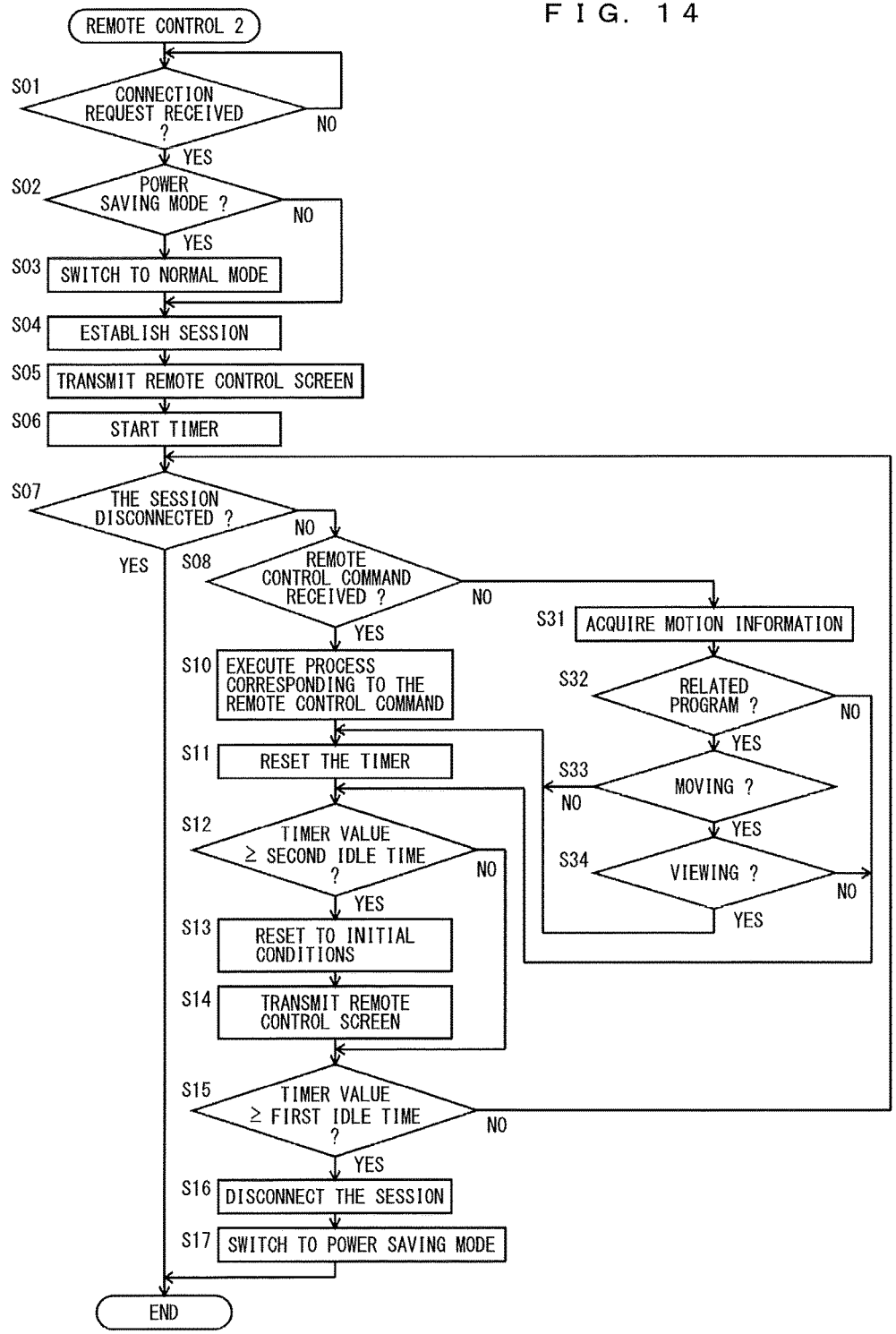
FIG. 14 is a flowchart illustrating an example of the flow of the remote control process according to the second embodiment.

FIG. 14 is a flowchart illustrating an example of the flow of the remote control process according to the second embodiment. Referring to FIG. 14, the process shown differs from the remote control process shown in FIG. 9 in that step S09 has been removed and that steps S18 to S21 have been replaced with steps S31 to S34. The other steps are the same as those in FIG. 9, and thus, the description thereof will not be repeated here.

If it is determined in step S08 that a remote control command has been received, in the following step S10, CPU 111A performs the process determined in correspondence with the remote control command, and the process proceeds to step S11. If it is determined in step S08 that a remote control command has not be received, the process proceeds to step S31.

In step S31, CPU 111A acquires motion information. Specifically, via communication I/F portion 112, CPU 111A requests transmission of the motion information from mobile information device 200 and receives the motion information that mobile information device 200 returns. CPU 111A then determines the motion of the user who is operating mobile information device 200, on the basis of the motion information. In step S32, CPU 111A determines whether the application program specified by the application identification information included in the motion information is a related program. If the application identification information included in the motion information has been registered in the related program table stored in HDD 115, CPU 111A determines that the application program specified by the application identification information included in the motion information is the related program. If the application program specified by the application identification information included in the motion information is the related program, the process proceeds to step S33; otherwise, the process proceeds to step S12.

In step S33, CPU 111A determines whether the user of mobile information device 200 is moving. If the motion information includes the moving signal, CPU 111A determines that the user is moving. If the moving signal is included in the motion information, the process proceeds to step S34; otherwise, the process proceeds to step S11. In step S34, CPU 111A determines whether the line of sight of the user of mobile information device 200 is in the direction of the display surface of mobile information device 200. If the motion information includes the viewing signal, CPU 111A determines that the line of sight of the user of mobile information device 200 is in the direction of the display surface of mobile information device 200. If the viewing signal is included in the motion information, the process proceeds to step S11; otherwise, the process proceeds to step S12.

Figure 15:
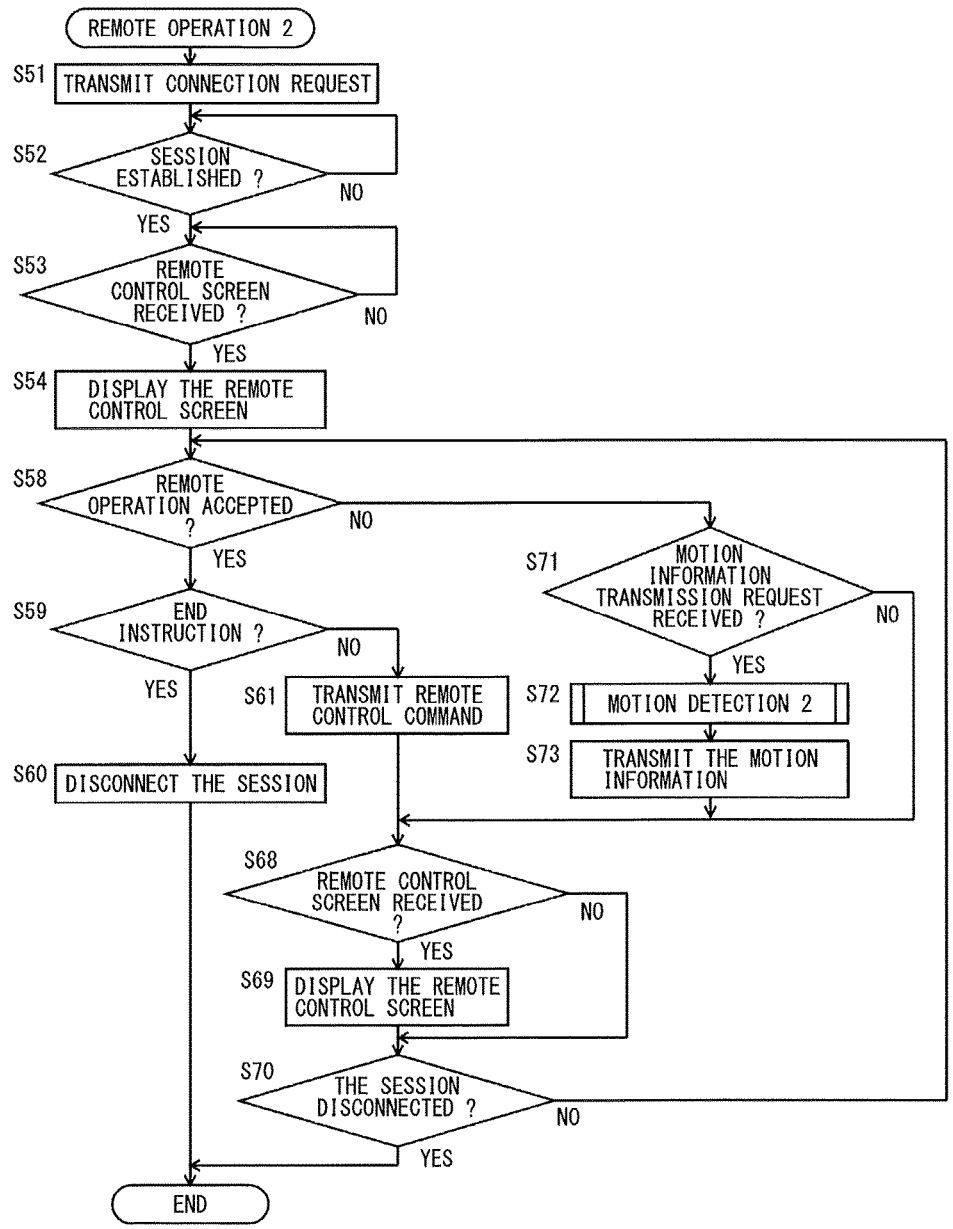
FIG. 15 is a flowchart illustrating an example of the flow of the remote operation process according to the second embodiment.

FIG. 15 is a flowchart illustrating an example of the flow of the remote operation process according to the second embodiment. Referring to FIG. 15, the process shown differs from the remote operation process shown in FIG. 10 in that steps S55 to S57 and S62 to S67 have been removed, and that steps S71 to S73 have been added. The other steps are the same as those in FIG. 10, and thus, the description thereof will not be repeated here.

If it is determined in step S58 that a remote operation has been accepted, the process proceeds to step S59; otherwise, the process proceeds to step S71. In step S59, CPU 201A determines whether the remote operation accepted in step S58 is an end instruction. If so, the process proceeds to step S60; otherwise, the process proceeds to step S61. In step S60, CPU 201A disconnects the session established in step S52, and the process is terminated.

In step S61, CPU 201A controls wireless LAN I/F 208 to transmit a remote control command corresponding to the remote operation accepted in step S58, to MFP 100. The process then proceeds to step S68.

On the other hand, if it is determined in step S58 that a remote operation has not been accepted, in step S71, CPU 201A determines whether a transmission request for motion information has been received. Specifically, CPU 201A determines whether wireless LAN I/F 208 has received a motion information transmission request from MFP 100. If so, the process proceeds to step S72; otherwise, the process proceeds to step S68. In step S72, CPU 201A performs a motion detection process according to the second embodiment, and the process proceeds to step S73. The motion detection process according to the second embodiment, the details of which will be described later, is the process of detecting the motion of the user of mobile information device 200 and generating the motion information. In step S73, CPU 201A transmits, to MFP 100, the motion information that has been generated through the execution of the motion detection process. The process then proceeds to step S68.

Figure 16:
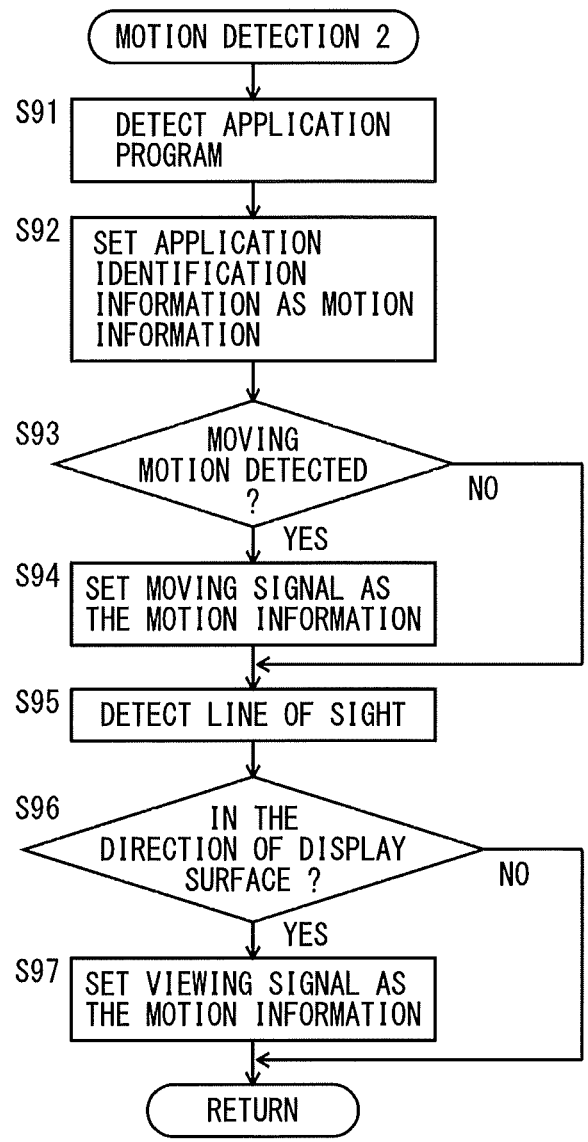
FIG. 16 is a flowchart illustrating an example of the flow of the motion detection process according to the second embodiment.

FIG. 16 is a flowchart illustrating an example of the flow of the motion detection process according to the second embodiment. The motion detection process in the second embodiment is carried out in step S72 in FIG. 15. Referring to FIG. 16, CPU 201A detects an application program being executed by CPU 201A (step S91). Specifically, the application program being executed by CPU 201A is acquired from the operating system executed by CPU 201A. In the following step S92, CPU 201A sets the application identification information of the application program detected in step S91, as the motion information, and the process proceeds to step S93.

In step S93, CPU 201A determines whether a moving motion has been detected. Specifically, when CPU 201A detects a change in acceleration input from acceleration sensor 210, CPU 201A detects the moving motion. Further, when CPU 201A detects a change in current position detected by position detecting portion 209, CPU 201A detects the moving motion. If the moving motion is detected, the process proceeds to step S94; otherwise, the process proceeds to step S95. In step S94, CPU 201A sets a moving signal as the motion information, and the process proceeds to step S95.

In step S95, CPU 201A detects a line of sight of the user. Specifically, CPU 201A controls camera 202 and analyzes the image data that camera 202 outputs as it picks up an image of the subject, to detect the line of sight. CPU 201A then determines whether the line of sight is in the direction of the display surface of display portion 206 (step S96). If the pupil is at the center in the eye region, CPU 201A determines that the line of sight is in the direction of the display surface of display portion 206. If the line of sight is in the direction of the display surface of display portion 206, the process proceeds to step S97; otherwise, the process returns to the remote operation process. In step S97, CPU 201A sets a viewing signal as the motion information, and the process returns to the remote operation process.

<Fourth Modification>

MFP 100 according to a fourth modification detects a remote-operation motion in the case where the user of mobile information device 200 is viewing display portion 206. In the fourth modification, remote-operation motion determining portion 73 in FIG. 13 detects the remote-operation motion when a viewing signal is included in the motion information input from motion information acquiring portion 71. In this case, it is irrelevant whether application identification information of an executing program is included in the motion information or not, and it is irrelevant whether a moving signal is included in the motion information or not. Accordingly, application detecting portion 271 and moving-motion detecting portion 273 in FIG. 12 and application registration portion 75 in FIG. 13 become unnecessary.

<Fifth Modification>

MFP 100 according to a fifth modification detects a remote-operation motion in the case where the user of mobile information device 200 is not moving. In the fifth modification, remote-operation motion determining portion 73 in FIG. 13 detects the remote-operation motion when no moving signal is included in the motion information input from motion information acquiring portion 71. In this case, it is irrelevant whether application identification information of an executing program is included in the motion information or not, and it is irrelevant whether a viewing signal is included in the motion information or not. Accordingly, application detecting portion 271, image pick-up control portion 275, and line-of-sight detecting portion 277 in FIG. 12 and application registration portion 75 in FIG. 13 become unnecessary.

<Sixth Modification>

MFP 100 according to a sixth modification detects a remote-operation motion in the case where the user of mobile information device 200 is not moving. MFP 100 also detects a remote-operation motion in the case where the user is viewing display portion 206, even if the user is moving. In the sixth modification, remote-operation motion determining portion 73 in FIG. 13 detects the remote-operation motion when no moving signal is included in the motion information input from motion information acquiring portion 71. Further, even in the case where the moving signal is included in the motion information, when the viewing signal is included in the motion information, remote-operation motion determining portion 73 detects the remote-operation motion. In this case, it is irrelevant whether application identification information of an executing program is included in the motion information or not. Accordingly, application detecting portion 271 in FIG. 12 and application registration portion 75 in FIG. 13 become unnecessary.

In print system 1A according to the second embodiment, in the case where MFP 100 determines, after a communication with mobile information device 200 has been established, that the motion of the user who is operating mobile information device 200 is the remote-operation motion, MFP 100 maintains the state of being remotely controlled by mobile information device 200. Accordingly, as long as the user who is operating mobile information device 200 is in the remote-operation motion, MFP 100 can maintain the state of being remotely controlled by mobile information device 200, even if no remote operation is input.

In the case where the application program which is specified by the application identification information included in the motion information acquired from mobile information device 200 is a predetermined related program, MFP 100 determines that the user's motion is the remote-operation motion. This allows the user of mobile information device 200 to execute the application program while remotely operating MFP 100.

MFP 100 determines that the user's motion is the remote-operation motion on the condition that the motion information acquired from mobile information device 200 does not include moving-motion information. The user may move without terminating the remote operation. The above configuration can improve the availability of MFP 100 even in such a case that the user has forgotten the termination operation.

MFP 100 determines that the user's motion is the remote-operation motion in the case where the motion information acquired from mobile information device 200 includes viewing information indicating that the user's line of sight is in the direction of display portion 206 included in mobile information device 200. In the state where an image is being displayed in mobile information device 200, the probability that the user is operating mobile information device 200 is high as long as the user's line of sight is in the direction of display portion 206. The above configuration makes it possible for the user to continue the operation of remotely controlling MFP 100 while operating mobile information device 200.

In the state where MFP 100 has its operating mode switched to the normal mode, when a predetermined first idle time has passed without being remotely controlled, MFP 100 switches the operating mode to the power saving mode. However, MFP 100 prohibits the switching to the power saving mode as long as it is being remotely operated. Accordingly, MFP 100 can be maintained in the normal mode while it is remotely operated.

Further, when a predetermined second idle time has passed without being remotely controlled, MFP 100 sets the operating conditions to predetermined initial conditions. However, MFP 100 prohibits the setting of the operating conditions to the initial conditions as long as it is being remotely operated. This allows the user to maintain the operating conditions set to MFP 100 during the remote operation.

While mobile information device 200 has been described as an example of the information processing apparatus and MFP 100 has been described as an example of the image forming apparatus in the above embodiments, the present invention can of course be understood as: a remote control method shown in FIG. 9 or 14; a remote control program which causes CPU 111 or 111A included in MFP 100 to perform the remote control method; a remote operation method shown in FIGS. 10 and 11 or FIGS. 15 and 16; or a remote operation program which causes CPU 201 or 201A included in mobile information device 200 to perform the remote operation method.

Although the present invention has been described and illustrated in detail, it is clearly understood that the same is by way of illustration and example only and is not to be taken by way of limitation, the spirit and scope of the present invention being limited only by the terms of the appended claims.

APPENDIX (1) The information processing apparatus according to claim 3, further comprising an acceleration detecting portion to detect an acceleration, wherein
said moving-motion detecting portion detects said moving motion as long as the acceleration is being detected by said acceleration detecting portion.

(2) The information processing apparatus according to claim 3, further comprising a position detecting portion to detect a current position, wherein
said moving-motion detecting portion detects said moving motion on the basis of two or more positions detected at different times by said position detecting portion.

What is claimed is:
1. An information processing apparatus remotely controlling an image forming apparatus having an operating state changeable, the information processing apparatus comprising:
a memory configured to store a related program table comprising a plurality of application programs; and
a hardware processor configured to:
accept an operation by a user;
execute a remote application program to remotely control said image forming apparatus on the basis of a remote operation accepted;
execute an application program;
determine whether the application program being executed is one of the plurality of application programs stored in the related program table of the memory; and
remotely control said image forming apparatus not to change the operating state based on determining that the application program being executed is one of the plurality of application programs stored in the related program table, the application program being differ- ent from the remote application program for remotely controlling said image forming apparatus after a communication with said image forming apparatus has been established, the hardware processor of the information processing apparatus executing the application program without communicating with the image forming apparatus to execute the application program.

2. The information processing apparatus according to claim 1, wherein the hardware processor is configured to detect a moving motion of the user, and the hardware processor is configured to remotely control the image forming apparatus not to change the operating state on the condition that the moving motion is not detected.

3. The information processing apparatus according to claim 1, further comprising:

a display portion to display an image; and an image pick-up portion to pick up an image of a subject, wherein said hardware processor is configured to detect a line of sight of the user on the basis of the image picked up by said image pick-up portion, and the hardware processor is configured to remotely control the image forming apparatus not to change the operating state as long as the user's line of sight detected in the state where an image is displayed by said display portion is in the direction of said display portion, irrespective of the time elapsed from when a remote operation was lastly accepted.

4. The information processing apparatus according to claim 1, wherein said image forming apparatus includes a second hardware processor configured, in the state where an operating mode has been switched to a normal mode, in response to a lapse of a predetermined idle time without being remotely controlled by said information processing apparatus, to switch the operating mode to a power saving mode in which less power is consumed than in said normal mode, and said hardware processor of the information processing apparatus is configured to remotely operate said image forming apparatus before said idle time passes from when a remote operation was lastly accepted.

5. The information processing apparatus according to claim 1, wherein the operating state of the image forming apparatus includes a normal mode and a power saving mode in which less power is consumed than in the normal mode, and the hardware processor is further configured to remotely control said image forming apparatus to maintain said normal mode when the hardware processor determines the application program being executed is one of the plurality of application programs stored in the related program table of the memory.

6. The information processing apparatus according to claim 1, wherein said plurality of application programs includes at least two programs from among a browsing program, a program for an address book, an image editing program, and a program for a social network service.

7. The information processing apparatus according to claim 1, wherein the application program is executed solely by the hardware processor of the information processing apparatus.

8. An image forming apparatus remotely controlled by an information processing apparatus, the image forming apparatus comprising a hardware processor configured to:

acquire, from said information processing apparatus, motion information indicating a motion of a user who is operating said information processing apparatus; and maintain, on the basis of the motion information acquired, a state of being remotely controlled by said information processing apparatus based on the information processing apparatus determining that an application program executed by said information processing apparatus is one of a plurality of application programs stored in a related program table in a memory of the information processing apparatus, the application program being different from a remote application program for remotely controlling said image forming apparatus after a communication with said information processing apparatus has been established, the application program being executed by the information processing apparatus without communicating with the image forming apparatus to execute the application program.

9. The image forming apparatus according to claim 8, wherein said motion information includes application identification information for identifying the application program, and said hardware processor is configured to determine whether the motion of the user is a remote-operation motion based on whether said application program is one of the plurality of application programs stored in the related program table in the memory of the information processing apparatus based on the application identification information included in said motion information.

10. The image forming apparatus according to claim 9, wherein in the case where the user is moving, said motion information includes moving-motion information indicating that the user is moving, and said hardware processor is configured to determine that the motion of the user is the remote-operation motion on the condition that said motion information does not include the moving-motion information.

11. The image forming apparatus according to claim 10, wherein in the case where a line of sight of the user is in the direction of a display portion included in said information processing apparatus, said motion information includes viewing information indicating that the user is viewing the display portion, and said hardware processor is configured to determine that the motion of the user is the remote-operation motion on the condition that said motion information includes said viewing information, even if said motion information includes said moving-motion information.

12. The image forming apparatus according to claim 8, wherein the hardware processor is configured, in the state where an operating mode has been switched to a normal mode, in response to a lapse of a predetermined idle time without being remotely controlled by said information processing apparatus, to switch the operating mode to a power saving mode in which less power is consumed than in said normal mode, and said hardware processor is configured to prohibit the switching of the operating mode to the power saving mode.

13. The image forming apparatus according to claim 8, wherein
the operating state includes a normal mode and a power saving mode in which less power is consumed than in the normal mode, and
the hardware processor is further configured to maintain said normal mode when the application program being executed is one of the plurality of application programs stored in the related program table in the memory of the information processing apparatus.

14. The image forming apparatus according to claim 8, wherein said plurality of application programs includes at least two programs from among a browsing program, a program for an address book, an image editing program, and a program for a social network service.

15. An image forming apparatus remotely controlled by an information processing apparatus, the image forming apparatus comprising a hardware processor configured to:
acquire, from said information processing apparatus, motion information indicating a motion of a user who is operating said information processing apparatus;
determine whether the motion of the user is a remote-operation motion, on the basis of the motion information acquired;
maintain a state of being remotely controlled by said information processing apparatus in the case where said hardware processor determines that the motion of the user after a communication with said information processing apparatus has been established is the remote-operation motion;
execute a process; and
set, in response to being remotely controlled by said information processing apparatus, an operating condition for said hardware processor to execute a process;
set said operating condition to a predetermined initial condition in the case where a predetermined idle time has passed without being remotely controlled by said information processing apparatus, wherein
said hardware processor is further configured to prohibit the setting of the operating condition to the initial condition.

16. A non-transitory computer-readable recording medium encoded with a remote operation program performed by a computer controlling an information processing apparatus, the information processing apparatus remotely controlling an image forming apparatus having an operating state changeable, the program causing said computer to perform:
a remote operation accepting step of accepting an operation of a user;
a remote control step of remotely controlling said image forming apparatus on the basis of a remote operation accepted in said remote operation accepting step;
an application executing step of executing an application program; and
a determining step of determining whether the application being executed is one of a plurality of application programs stored in a related program table in a memory of the information processing apparatus, wherein
the remote control step includes
a state maintaining step of causing said image forming apparatus not to change the operating state based on determining that the application program executed in the application executing step is one of the plurality of application programs stored in the related program table in the memory of the information processing apparatus, the application program being different from a remote application program for remotely controlling said image forming apparatus after a communication with said image forming apparatus has been established, the program causing the information processing apparatus to execute the application program without communicating with the image forming apparatus.

17. The non-transitory computer-readable recording medium according to claim 16, wherein
the operating state of the image forming apparatus includes a normal mode and a power saving mode in which less power is consumed than in the normal mode, and
the state maintaining step includes maintaining said normal mode when the application program being executed is one of the plurality of application programs stored in the related program table in the memory of the information processing apparatus.

18. The non-transitory computer-readable recording medium according to claim 16, wherein said plurality of application programs includes at least two programs from among a browsing program, a program for an address book, an image editing program, and a program for a social network service.

19. A non-transitory computer-readable recording medium encoded with a remote control program performed by a computer controlling an image forming apparatus, the image forming apparatus being remotely controlled by an information processing apparatus, the program causing said computer to perform:
a motion information acquiring step of acquiring, from said information processing apparatus, motion information indicating a motion of a user who is operating said information processing apparatus; and
a remotely-controlled-state maintaining step for, on the basis of the motion information acquired, maintaining a state of being remotely controlled by said information processing apparatus based on the information processing apparatus determining that the application program executed by said information processing apparatus is one of a plurality of application programs stored in a related program table in a memory of the information processing apparatus, the application program being different from a remote application program for remotely controlling said image forming apparatus after a communication with said information processing apparatus has been established, the application program being executed by the information processing apparatus without communicating with the image forming apparatus to execute the application program.

20. The non-transitory computer-readable recording medium according to claim 19, wherein
the operating state of the image forming apparatus includes a normal mode and a power saving mode in which less power is consumed than in the normal mode, and
the remotely-controlled-state maintaining step includes maintaining said normal mode when the application program being executed is one of the plurality of application programs stored in the related program table in the memory of the information processing apparatus.

21. The non-transitory computer-readable recording medium according to claim 19, wherein said plurality of application programs includes at least two programs from among a browsing program, a program for an address book, an image editing program, and a program for a social network service.

22. A non-transitory computer-readable recording medium encoded with a remote control program performed by a computer controlling an image forming apparatus, the image forming apparatus being remotely controlled by an information processing apparatus, the program causing said computer to perform:
- a motion information acquiring step of acquiring, from said information processing apparatus, motion information indicating a motion of a user who is operating said information processing apparatus;
- a remote-operation motion determining step of determining whether the motion of the user is a remote-operation motion on the basis of the motion acquired in the motion information acquiring step;
- a remotely-controlled-state maintaining step of maintaining a state of being remotely controlled by said information processing apparatus in a case where said remote-operation motion determining step determines that the motion of the user after a communication with said information processing apparatus has been established is the remote-operation motion;
- a process executing step of executing a process; and
- a setting step of setting an operation condition, in response to being remotely controlled by said information processing apparatus, for said process executing step to execute the process, the setting step including an initial condition setting step of setting said operation condition to a predetermined initial condition in the case where a predetermined idle time has passed without being remotely controlled by said information processing apparatus, wherein
- said remotely-controlled-state maintaining step includes an initialization prohibiting step of prohibiting the setting of the operating condition to the initial condition in said initial condition setting step.

23. An image forming apparatus remotely controlled by an information processing apparatus, the image forming apparatus comprising a hardware processor configured to:
- acquire, from said information processing apparatus, motion information indicating a motion of a user who is operating said information processing apparatus; and
- maintain, on the basis of the motion information acquired, a state of being remotely controlled by said information processing apparatus based on whether an application program executed by said information processing apparatus is a predetermined program being different from a remote application program for remotely controlling said image forming apparatus after a communication with said information processing apparatus has been established, wherein
- said motion information includes application identification information for identifying the application program, and
- said hardware processor is configured to determine whether the motion of the user is a remote-operation motion based on whether said application program is said predetermined program based on the application identification information included in said motion information.

24. The image forming apparatus according to claim 23, wherein
- in the case where the user is moving, said motion information includes moving-motion information indicating that the user is moving, and
- said hardware processor is configured to determine that the motion of the user is the remote-operation motion on the condition that said motion information does not include the moving-motion information.

25. The image forming apparatus according to claim 24, wherein
- in the case where a line of sight of the user is in the direction of a display portion included in said information processing apparatus, said motion information includes viewing information indicating that the user is viewing the display portion, and
- said hardware processor is configured to determine that the motion of the user is the remote-operation motion on the condition that said motion information includes said viewing information, even if said motion information includes said moving-motion information.

26. The image forming apparatus according to claim 23, wherein the hardware processor is configured, in the state where an operating mode has been switched to a normal mode, in response to a lapse of a predetermined idle time without being remotely controlled by said information processing apparatus, to switch the operating mode to a power saving mode in which less power is consumed than in said normal mode, and
- said hardware processor is configured to prohibit the switching of the operating mode to the power saving mode.

* * * * *